United States Patent [19]

Filges et al.

[11] Patent Number: 5,532,329
[45] Date of Patent: Jul. 2, 1996

[54] COPOLYMERS AND MIXTURES WHICH ARE SELF-CURABLE WITH ATMOSPHERIC HUMIDITY

[75] Inventors: Ulrich Filges, Limburgerhof; Oral Aydin, Mannheim; Gerhard Auchter, Bad Duerkheim; Juergen Barwich, Neustadt; Hermann Anders, Meckenheim; Werner Langer; Klaus Vorspohl, both of Ludwigshafen, all of Germany

[73] Assignee: BASF Aktiengesellschaft, Ludwigshafen, Germany

[21] Appl. No.: 365,316

[22] Filed: Dec. 28, 1994

Related U.S. Application Data

[63] Continuation of Ser. No. 201,054, Feb. 24, 1994, abandoned, which is a continuation of Ser. No. 800,251, Nov. 29, 1991, abandoned.

[30] Foreign Application Priority Data

Dec. 6, 1990 [DE] Germany ............... 40 38 939.1

[51] Int. Cl.$^6$ ............... C08F 230/08; C08F 220/08; C08F 220/52; C08F 226/02; C08F 220/10; C08F 218/04

[52] U.S. Cl. ............... 526/279; 526/328.5; 526/330; 526/271; 526/310; 526/312

[58] Field of Search ............... 526/279, 271, 526/310, 312, 328.5, 330

[56] References Cited

U.S. PATENT DOCUMENTS

| | | | |
|---|---|---|---|
| 4,259,231 | 3/1981 | Tomomoto et al. | 260/42.52 |
| 4,351,755 | 9/1982 | Brixius et al. | 524/555 |
| 4,376,187 | 3/1983 | Theodore et al. | |
| 4,543,403 | 9/1985 | Isayama et al. | 526/263 |
| 4,937,293 | 6/1990 | Blum et al. | 525/327.6 |
| 4,988,760 | 1/1991 | Jung et al. | |
| 4,990,583 | 2/1991 | Wamprecht et al. | 526/271 |
| 5,082,884 | 1/1992 | Filges et al. | 524/188 |
| 5,128,386 | 7/1992 | Rehmer et al. | 522/35 |

FOREIGN PATENT DOCUMENTS

| | | |
|---|---|---|
| 2014780 | 10/1990 | Canada. |
| 0054632 | 6/1982 | European Pat. Off.. |
| 0075206 | 3/1983 | European Pat. Off.. |
| 0118821 | 9/1984 | European Pat. Off.. |
| 0122457 | 10/1984 | European Pat. Off.. |
| 0149765 | 7/1985 | European Pat. Off.. |
| 0307701 | 3/1989 | European Pat. Off.. |
| 0337976 | 10/1989 | European Pat. Off.. |
| 0387587 | 9/1990 | European Pat. Off.. |
| 2643642 | 3/1978 | Germany. |
| 3601272 | 7/1986 | Germany. |
| 3710963 | 10/1988 | Germany. |
| 2172292 | 9/1986 | United Kingdom. |
| WO90/00570 | 1/1990 | WIPO. |

OTHER PUBLICATIONS

Chemical Abstracts, vol. 91, No. 8, Aug. 20, 1979, AN–58862c, JP–54–034397, Mar. 13, 1979.

Primary Examiner—Joseph L. Schofer
Assistant Examiner—Wu C. Cheng
Attorney, Agent, or Firm—Oblon, Spivak, McClelland, Maier & Neustadt

[57] ABSTRACT

Copolymers which are self-curable with atmospheric humidity and are based on acrylic, methacrylic and/or vinyl esters which have been prepared using silicon-containing regulators, and mixtures of such polymers with crosslinkers, are suitable as adhesive, sealing and coating compositions which are self-curable with atmospheric humidity.

15 Claims, No Drawings

COPOLYMERS AND MIXTURES WHICH ARE SELF-CURABLE WITH ATMOSPHERIC HUMIDITY

This application is a continuation of application Ser. No. 08/201,054, filed on Feb. 24, 1994, now abandoned, which is a continuation of application Ser. No. 07/800,251, filed Nov. 29, 1991, now abandoned.

The present invention relates to novel copolymers which are self-curable with atmospheric humidity and are based on acrylic, methacrylic and/or vinyl esters and mixtures of such copolymers with crosslinkers of the following composition:

A) copolymers (=100% by weight) composed of
  a) from 30 to 99.45% by weight of one or more $C_1$–$C_{24}$-alkyl esters of acrylic and/or methacrylic acid and/or $C_1$–$C_{20}$ vinyl esters (compounds I),
  b) from 0.5 to 20% by weight of one or more isocyanate-containing monomers (compounds II),
  c) from 0 to 25% by weight of a carboxylic anhydride which can undergo free radical polymerization (compounds III),
  d) from 0 to 40% by weight of other monomers (compounds IV) and
  e) from 0.05 to 5% by weight of a regulator of the formula Va or Vb

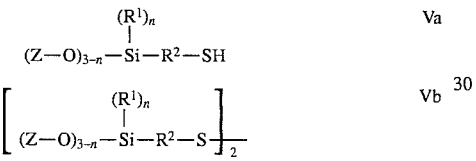

where
n is from 0 to 2,
$R^1$ is $C_1$–$C_6$-alkyl or phenyl,
$R^2$ is $C_1$–$C_{18}$-alkyl, cyclohexyl or phenyl,
Z is $C_1$–$C_{18}$-alkyl, $C_2$–$C_{18}$-alkenyl or $C_2$–$C_{18}$-alkynyl, whose carbons can be replaced by non-adjacent oxygens or halogens, or

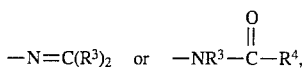

where
$R^3$ is $C_1$—$C_{12}$-alkyl and
$R^4$ is $C_1$—$C_{18}$-alkyl;

B) curable mixtures of
  1) from 50 to 99.9% by weight of a copolymer B1 (=100% by weight) composed of
    a) from 30 to 99.9% by weight of the compounds I,
    b) from 0.1 to 50% by weight of the compounds III,
    c) from 0 to 50% by weight of the compounds IV and
    d) from 0 to 5% by weight of the compounds Va or Vb, and
  2) from 0.1 to 50% by weight of a di- or polyisocyanate (compounds VI);

C) curable mixtures of
  1) from 9 to 70% by weight of a copolymer C1 (=100% by weight) composed of
    a) from 50 to 99.9% by weight of the compounds I,
    b) from 0.1 to 20% by weight of the compounds III and
    c) from 0 to 30% by weight of the compounds IV, and
  2) from 29 to 90% by weight of a copolymer C2 (=100% by weight) composed of
    a) from 60 to 99.5% by weight of the compounds I,
    b) from 0.5 to 10% by weight of a comonomer with one or more hydroxyls (compounds VII) and
    c) from 0 to 30% by weight of the compounds IV, and
  3) from 1 to 30% by weight of the compounds VI, with the proviso that one hydroxyl in compounds VII corresponds to from 1.7 to 2.3 isocyanates in compounds VI;

D) curable mixtures of
  1) from 50 to 99.9% by weight of a copolymer D1 (=100% by weight) composed of
    a) from 30 to 99.45% by weight of the compounds I,
    b) from 0.5 to 25% by weight of the compounds III,
    c) from 0 to 40% by weight of the compounds IV and
    d) from 0.05 to 5% by weight of the compounds Va or Vb, and
  2) from 0.1 to 50% by weight of a di- or polyaldimine and/or ketimine (compounds VIII) and E) curable mixtures of
  1) from 40 to 98% by weight of a copolymer E1 (=100% by weight ) composed of
    a) from 60 to 99.5% by weight of the compounds I,
    b) from 0.5 to 10% by weight of the compounds VII and
    c) from 0 to 30% by weight of the compounds IV, and
  2) from 1 to 30% by weight of the compounds VI and
  3) from 1 to 30% by weight of the compounds VIII, with the proviso that one hydroxyl in the compounds VII corresponds to from 1.7 to 2.3 isocyanates in the compounds VI.

The present invention also relates to the use of these copolymers A and curable mixtures B, C, D and E as adhesive, sealing and coating compositions which are self-curable with atmospheric humidity and to adhesive, sealing and coating compositions which are self-curable with atmospheric humidity and contain the copolymers A or the curable mixtures B, C, D or E.

The earlier German Application P 3913168 discloses copolymers based on alkyl acrylates and/or methacrylates with free isocyanate groups, which are recommended as adhesives, coating and sealing compositions.

However, these copolymers are not entirely satisfactory because their intrinsically good flow properties are still in need of further improvement.

Although improvement in the flow properties by using conventional mercaptan regulators is described, the use thereof results in inadequate crosslinking on exposure to humidity, especially when high regulator concentrations are required to reduce the molecular weight.

Copolymers with free isocyanate groups plus free anhydride groups are described in DE-A 38 04 589.

However, these copolymers are suitable only as binder components in two-component coating and sealing compositions which also contain organic polyhydroxy compounds.

DE-A 3 601 272 discloses adhesives composed of at least diisocyanates and anhydride-containing copolymers with active hydrogen. These adhesives are, by their nature, recommended only as two-component adhesives because mixing the components to give a one-component adhesive would result in immediate reaction of the activated copolymers with the isocyanates. In addition, this reaction means that the pot life is inadequate owing to rapid gelling on use of the adhesive. Furthermore, this reaction leads to blistering, because of early decarboxylation, and too high a surface tackiness of the adhesives in the cured state.

Isocyanate-containing copolymers composed of hydroxyl-containing acrylates and di- or polyisocyanates are described in DE-A 29 15 864 as curable one-component sealants. The disadvantages are both the decrease in elasticity after prolonged storage, owing to the high density of crosslinking in the cured sealing materials, and the blistering caused by decarboxylation.

DE-A 37 10 963 discloses anhydride-containing copolymers with di- or polyaldimines and/or -ketimines, which are recommended as binder combinations curable by humidity. However, these binders have poor flow properties and tend to surface tackiness in the cured state.

It is an object of the present invention to provide novel copolymers and mixtures of such copolymers with crosslinkers, which have improved use properties and can be used, in particular, as adhesive, sealing and coating compositions which are self-curable with atmospheric humidity.

We have found that this object is achieved by the copolymers A and mixtures B, C, D and E defined in the introduction, and the use thereof as adhesive, sealing and coating compositions which are self-curable with atmospheric humidity.

We have also found adhesives, sealing and coating compositions which are self-curable with atmospheric humidity and contain the copolymers A or the curable mixtures B, C, D or E.

The copolymers A which are self-curable with atmospheric humidity, according to the invention, are prepared from 30 to 99.45% by weight, preferably 40 to 96.9% by weight, of one or more $C_1$–$C_{24}$-alkyl esters of acrylic and/or methacrylic acid and/or $C_{1-C20}$ vinyl esters as compound I, from 0.5 to 20% by weight, preferably 1 to 8% by weight, of one or more isocyanate-containing monomers as compound II and from 0.05 to 5% by weight, preferably 0.1 to 2% by weight, of an Si regulator as compound Va or Vb.

In addition, the copolymers A according to the invention can also contain up to 25% by weight of a carboxylic anhydride which can undergo free radical polymerization as compound III. When compound III is used, an amount of from 2 to 10% by weight is preferred. In addition, up to 40% by weight of other monomers can be added as compounds IV.

Suitable compounds I are $C_1$–$C_{24}$-alkyl esters of acrylic and/or methacrylic acid and/or $C_1$–$C_{20}$ vinyl esters. Particularly preferred compounds I are the $C_1$–$C_4$-alkyl esters of acrylic and/or methacrylic acid, eg. methyl, ethyl, n-propyl and n-butyl acrylates and methacrylates. Preferred are isopropyl, iso-butyl, sec-butyl, tert-butyl, n-pentyl, n-hexyl, 2-ethylhexyl, cyclohexyl, n-heptyl, n-octyl, phenylethyl and phenylpropyl acrylates and methacrylates. Mention may also be made of oxygen-containing alkyl esters of acrylic and/or methacrylic acid such as 2-ethoxyethyl, 2-butoxyethyl and furfuryl acrylates and methacrylates. Also suitable are vinyl esters such as vinyl formate, acetate, propionate, butyrate, laurate and stearate.

Suitable as compounds II are monomers with one or more, mainly one or two isocyanate groups, especially those with molecular weights from 69 to 400.

5-Isocyanato-3-oxapentyl methacrylate is particularly preferred. Preferred compounds II are isocyanatoethyl acrylate and methacrylate, m-isopropenyl-α,α-dimethylbenzyl isocyanate and bis(2-isocyanatoethyl) fumarate. Mention may also be made of allyl isocyanate and vinyl isocyanate and of monoadducts of polymerizable hydroxy compounds and diisocyanates such as the product of the reaction of 1 mol of 1,6-diisocyanatohexane or 1 mol of 1-isocyanato-3, 3,5-trimethyl-5-isocyanatomethylcyclohexane with 1 mol of 2-hydroxyethyl acrylate.

Suitable as compound III are carboxylic anhydrides which can undergo free radical polymerization, preferably itaconic anhydride, citraconic anhydride, cyclohexenedicarboxylic anhydride and, particularly preferably, maleic anhydride.

Additional further monomers as compounds IV are, in particular, vinylaromatic compounds such as α-methylstyrene, β-methylstyrene, vinyltoluenes and tert-butylstyrenes, halostyrenes such as chlorostyrenes, vinyl ethers of $C_1$–$C_8$-alkanols such as ethyl vinyl ether, vinyl esters of $C_2$–$C_{12}$-alkanoic acids such as vinyl acetate and vinyl propionate, vinyl halides such as vinyl chloride, lower unsaturated hydrocarbons such as α-olefins or conjugated hydrocarbons such as butadiene and isoprene.

Particularly preferred compounds IV are styrene and unsaturated nitriles such as, mainly, acrylonitrile and methacrylonitrile.

Suitable Si regulators are those of the formula Va or Vb

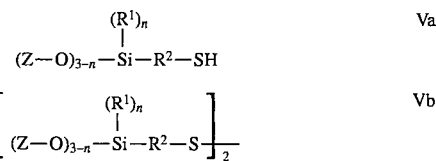

where n is from 0 to 2, $R^1$ is $C_1$–$C_6$-alkyl or phenyl, $R^2$ is $C_1$–$C_{18}$-alkyl, cyclohexyl or phenyl, Z is $C_1$–$C_{18}$-alkyl, $C_2$–$C_{18}$-alkenyl or $C_2$–$C_{18}$-alkynyl, whose carbons can be replaced by non-adjacent oxygens or halogens, or

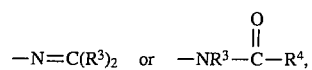

where $R^3$ is $C_1$–$C_{12}$-alkyl and $R^4$ is $C_1$–$C_{18}$-alkyl.

The compounds Va are particularly preferred, especially mercaptopropyltrimethoxysilane and mercaptopropyltriethoxysilane.

The curable mixtures B according to the invention are prepared from 50 to 99.9% by weight, preferably 70 to 99% by weight of a copolymer B1 and from 0.1 to 50% by weight, preferably 1 to 30% by weight of a di- or polyisocyanate as compound VI.

The copolymers B1 in turn are composed of from 30 to 99.9% by weight, preferably 38 to 98.4% by weight of the compounds I and from 0.1 to 50% by weight, preferably 1.5 to 10% by weight of the compounds III. The copolymers B1 can also contain up to 50% by weight of the compounds IV and up to 5% by weight of the compounds Va or Vb. When the compounds Va or Vb are used, an amount of from 0.1 to 2% by weight is preferred.

Copolymers B1 particularly preferred with a view to the adhesives, sealing and coating compositions which are self-curable with atmospheric humidity are those composed of a) from 90 to 95% by weight of the compounds I and b) from 5 to 10% by weight of the compounds III.

Particularly preferred curable mixtures B are those composed of 1) from 95 to 99% by weight of a copolymer B1 (=100% by weight) and 2) from 1 to 5% by weight of a di- or polyisocyanate (compounds VI).

Suitable as compounds VI are di- or polyisocyanates, preferably those with isocyanate contents of from 1 to 60% by weight NCO, particularly preferably 5 to 40% by weight NCO.

Particularly preferred compounds VI are triisocyanates such as tris(4-isocyanatophenyl)methane and especially those from the triisocyanurate series such as 2,4,6-trioxo-1, 3,5-tris(3-isocyanato-4-methylphenyl)hexahydro- 1,3,5-triazine, 2,4,6-trioxo-1,3,5-tris(6isocyanato- 1-hexyl)hexahydro-1,3,5-triazine and 2,4,6-trioxo- 1,3,5-tris(5-isocyanato-1,3,3-trimethylcyclohexylmethyl)hexahydro- 1,3,5-triazine. Also suitable are 2-ethyl- 1,2,3-tris(3-isocyanato-4-methylanilinocarbonyloxy)propane and 2,4-bis(4-isocyanatobenzyl)-1-isocyanatobenzene.

Preferred compounds VI are diisocyanates such as, in particular, 1,6-diisocyanatohexane, 2,4-diisocyanatotoluene, 2,6-diisocyanatotoluene, bis(4-isocyanatophenyl)methane and, very especially, 5-isocyanato-3-isocyanatomethyl- 1,1,3-trimethylcyclohexane (isophorone diisocyanate). Also suitable are 1,4-bis(2-isocyanatoethyl)cyclohexane and 1,3-bis(isocyanatomethyl)cyclohexane.

Also suitable as compounds VI are di- or triisocyanates of allophanates, carbodiimides, uretdiones and, especially, biurets such as bis(6-isocyanatohexylaminocarbonyl)-6-isocyanatohexylamine.

Also suitable as compounds VI are polyurethane prepolymers composed of polyisocyanates and polyols. Polyurethane prepolymers with isocyanate contents of from 1 to 30% by weight NCO, preferably 5 to 20% by weight NCO, are preferred.

Preferred polyisocyanates are di- and triisocyanates. Preferred polyols are those with functionalities of from 2 to 3, preferably 2, and molecular weights of from 1000 to 8000, preferably 1800 to 6000. Polythioetherpolyols, polyesteramides, hydroxyl-containing polyacetals and hydroxyl-containing aliphatic polycarbonates are preferred. Polyesterpolyols are particularly preferred, especially polyetherpolyols, in particular those with a functionality of 2 and molecular weights of from 1800 to 4000.

The polyether-polyols are generally prepared by anionic polymerization with alkali metal hydroxides or alkali metal alcoholates or by cationic polymerization with Lewis acids as catalysts from alkylene oxides in the presence or absence of starters.

Preferred alkylene oxides are tetrahydrofuran, 1,3-propylene oxide, 1,2- and 2,3-butylene oxide, styrene oxide and epichlorohydrin. Ethylene oxide and 1,2-propylene oxide are particularly preferred.

Suitable starters are water, organic dicarboxylic acids such as succinic acid, adipic acid, phthalic acid and terephthalic acid, alkanolamines such as ethanolamine, diethanolamine and triethanolamine, and ammonia. Preferred starters are di- and trihydric alcohols such as ethanediol, 1,2- and 1,3-propanediol, diethylene glycol, dipropylene glycol, 1,4-butanediol, 1,6-hexanediol, trimethylolpropane and, particularly preferably, glycerol.

The curable mixtures C according to the invention are prepared from 9 to 70% by weight, preferably 9 to 60% by weight of a copolymer C1, from 29 to 90% by weight, preferably 39 to 90% by weight of a copolymer C2 and from 1 to 30% by weight of the compounds VI, with the proviso that one hydroxyl in the compounds VII corresponds to from 1.7 to 2.3, preferably 1.9 to 2.1, isocyanates in the compounds VI.

The copolymers C1 in turn are composed of from 50 to 99.9% by weight, preferably 62 to 98% by weight of the compounds I and from 0.1 to 20% by weight, preferably 2 to 8% by weight of the compounds III. In addition, it is possible to use up to 30% by weight of the compounds IV.

The copolymers C2 in turn are composed of from 60 to 99.5% by weight, preferably 64 to 99% by weight of the compounds I and from 0.5 to 10% by weight, preferably 1 to 6% by weight of a comonomer with one or more hydroxyls as compounds VII. In addition, it is possible to use up to 30% by weight of the compounds IV.

Particularly preferred as compounds VI in the curable mixtures C are the diisocyanates, especially isophorone diisocyanate.

Suitable as compounds VII are comonomers with one or more hydroxyl groups. Hydroxyalkyl acrylates and methacrylates are preferred, especially the hydroxy-$C_2$–$C_6$-alkyl esters of acrylic and methacrylic acids such as hydroxyethyl, hydroxypropyl, hydroxybutyl, hydroxypentyl and hydroxyhexyl acrylates and methacrylates.

Also suitable are polyethylene glycol and polypropylene glycol monoacrylates and monomethacrylates with up to 6 ethoxy and propoxy units, respectively.

The curable mixtures D according to the invention are prepared from 50 to 99.9% by weight, preferably 70 to 99% by weight of a copolymer D1 and from 0.1 to 50% by weight, preferably 1 to 30% by weight of a di- or polyaldimine and/or -ketimine as compound VIII.

The copolymers D1 in turn are composed of from 30 to 99.45% by weight, preferably 48 to 96.9% by weight of the compounds I, from 0.5 to 25% by weight, preferably 3 to 10% by weight of the compounds III and from 0.05 to 5% by weight, preferably 0.1 to 2% by weight of the compounds Va or Vb. In addition, it is possible to use up to 40% by weight of the compounds IV.

Suitable as compounds VIII are di- or polyaldimines and/or -ketimines, with particular preference for trifunctional and, especially, difunctional from diamines and aldehydes and ketones. Particularly preferred diamines are $C_2$–$C_{16}$-alkylenediamines, preferably $C_2$–$C_{12}$-alkylenediamines and very particularly preferably $C_4$–$C_6$-alkylenediamines such as 1,4-butylenediamine, 1,5-pentamethylenediamine and 1,6-hexamethylenediamine.

Preferred are cyclo-$C_6$–$C_{20}$-alkylenediamines, preferably cyclo-$C_6$–$C_{15}$-alkylenediamines, especially diaminocyclohexanes, 3-aminomethyl-3,5,5-trimethylcyclohexylamine (isophoronediamine), hexahydrotoluylenediamines, diaminodicyclohexyls, diaminodicyclohexylmethanes and -propanes and, especially, 3,3'-dimethyl4,4'-diaminodicyclohexylmethane.

Also suitable are $C_4$–$C_{16}$-oxaalkylenediamines, preferably $C_4$–$C_{12}$-oxaalkylenediamines and very particularly preferably $C_4$–$C_9$-oxaalkylenediamines, especially di(4-aminobutyl) ether.

Additionally suitable are polyoxyalkylenepolyamines, preferably polyoxyalkylenediamines and -triamines, especially polyoxyethylenediamines.

Particularly preferred aldehydes are 2,2-dimethylpropanal and $C_1$–$C_4$-alkyl formylisobutyrates, especially methyl 2-formylisobutyrate.

Butyraldehyde, isobutyraldehyde, 2-ethylhexanal, 3-cyclohexene-1-carboxaldehyde and hexahydrobenzaldehyde are preferred.

Additionally suitable are formaldehyde, acetaldehyde, trimethylacetaldehyde, propionaldehyde and acrolein.

Particularly preferred ketones are methyl isopropyl ketone, methyl isobutyl ketone, methyl tert-butyl ketone, diethyl ketone and diisobutyl ketone.

Acetone, methyl ethyl ketone, methyl propyl ketone and methyl butyl ketone are preferred. Also suitable are methyl n-amyl ketone, methyl isoamyl ketone and methyl heptyl ketone.

The aldimines and ketimines are known or can be obtained by known methods, specifically by reacting the diamines with aldehydes and/or ketones, the preferred $NH_2$/CO ratio being from 1:1.1 to 1:4.

The reaction is expediently carried out in a solvent, preferably toluene, xylene, benzene, methylene chloride, chloroform, dichloroethane, cyclohexane or heptane.

The reaction of the diamines with the aldehydes and/or ketones is carried out, for example, by heating, generally at from 40° to 200° C., preferably at 80° to 130° C., in the presence of an inert gas such as nitrogen or argon and para-toluenesulfonic acid as catalyst, using a water trap, for from 1 to 10 hours.

The curable mixtures E according to the invention are prepared from 40 to 98% by weight of a copolymer E1, from 1 to 30% by weight of the compounds VI and from 1 to 30% by weight of the compounds VIII, with the proviso that one hydroxyl in the compounds VII corresponds to from 1.7 to 2.3, preferably 1.9 to 2.1, isocyanates in the compounds VI.

The copolymers E1 in turn are composed of from 60 to 99.5% by weight, preferably 64 to 99% by weight of the compounds I and from 0.5 to 10% by weight, preferably 1 to 6% by weight of the compounds VII. In addition, it is possible to use up to 30% by weight of the compounds IV.

Particularly preferred as compounds VI in the curable mixtures E are the diisocyanates, especially isophorone diisocyanate.

The copolymers A, B1, C1, C2, D1 and E1 are prepared by free radical polymerization in bulk or solution, the latter being preferred.

The solvents which are usually employed are ethers such as tetrahydrofuran and dioxane, esters such as ethyl, propyl and n-butyl acetates, glycol ether acetates such as methyl-, ethyl- and butylglycol acetate, ketones such as acetone and cyclohexanone, dialkylamides such as dimethylformamide, dimethylacetamide and N-methylpyrrolidone, aromatic compounds such as toluene and xylenes, aliphatic hydrocarbons such as isooctane and chlorohydrocarbons such as tert-butyl chloride.

It is likewise possible to use a plasticizer as polymerization solvent.

Initiators which can be employed for the free radical polymerization are the conventional peroxo or azo compounds, also in combination with reducing agents, expediently in amounts of from 0.05 to 10% of the weight of the monomers.

Preferred initiators are dibenzoyl peroxide, tert-butyl perpivalate, tert-butyl 2-ethylperhexanoate, di-tert-butyl peroxide, tert-butyl hydroperoxide, cumene hydroperoxide, dilauryl peroxide, tert-butyl peroxymaleate, tert-butyl peroxybenzoate, dicumyl peroxide, didecanoyl peroxide, methyl ethyl ketone peroxide, 2,2'-azobis(2,4-dimethylvaleronitrile), 2,2'-azobis(2,3-dimethylbutyronitrile) and 2,2'-azobisisobutyronitrile. Also suitable are silane-containing azo initiators (EP-A 159 710). Particularly preferred initiators for the polymerization of the copolymers C2 and E1 are hydroxyl-containing initiators such as azobiscyanopentanol and 2,2'-azobis[2-methyl-N-(2-hydroxyethyl)propionamide].

Preferred reducing agents are hydrazine, sodium sulfite, sodium bisulfite, potassium sulfite, potassium bisulfite, ammonium sulfite and ammonium bisulfite, which are employed in amounts of from 0.005 to 2% by weight.

To control the molecular mass it is preferable to add conventional regulators to the copolymers which contain no Si regulators Va or Vb. Preferred regulators are tetrachloromethane, tetrabromomethane, benzyl bromide, trichlorobromomethane, butyl mercaptan, n-dodecyl mercaptan, tert-dodecyl mercaptan, thiophenol and alkyl thioglycolates such as methyl and ethyl thioglycolates.

Particularly preferred regulators for the copolymers C2 and E1 are thiols which also contain one or more hydroxyl groups, eg. mercaptoethanol, mercaptopropanol and thioglycerol.

The latter are preferably employed in amounts of from 0.2 to 6% by weight, particularly preferably from 0.5 to 2% by weight. When these regulators and/or hydroxyl-containing initiators are used, the amount of the alcoholic compounds VII is reduced correspondingly.

The polymerization is generally carried out at from 0° to 200° C., preferably at 60° to 130° C.

The reaction is expediently carried out under atmospheric pressure but it is also possible to use reduced or slightly elevated pressure, ie. in the approximate range from 0.5 to 5 bar.

The reactions normally take from 1 to 30, usually 3 to 6 hours.

The procedure for the solution polymerization is usually such that a portion of the solvent is heated, with or without desiccants and/or a portion of the monomers III, to the reaction temperature and the monomer mixture, the regulator and the initiator, and the remainder of the solvent, are added continuously, preferably simultaneously but separately.

In the case of bulk polymerization, generally a portion of the polymerization mixture is introduced first and heated to the polymerization temperature, after which the remainder is added continuously.

After the addition is complete, the polymerization is continued, with or without the addition of further amounts of initiator, for about 2 hours in order to reduce the residual monomer content. However, residual monomers can also be removed by distillation of the solvent.

In order to prevent premature crosslinking of the isocyanate groups during the polymerization or during storage, the polymerization medium is expediently virtually anhydrous, ie. has a water content below 500 ppm, preferably below 100 ppm. This is generally achieved by using desiccants, also in combination with Lewis acids, which increase the rate of hydrolysis of the desiccants.

Preferred desiccants are tetraalkoxysilanes such as tetraethoxysilane, trialkyl orthoformates such as triethyl orthoformate, and isocyanates such as phenyl isocyanate.

The polymerization conditions are preferably chosen in a conventional manner so that the degree of polymerization of the copolymers A, B1 and D1 according to the invention corresponds to a K value of from 7 to 150, particularly 10 to 100 and especially 17 to 60. Preferred K values are from 10 to 150, in particular from 20 to 90 for the copolymers C1 and from 8 to 60, in particular from 10 to 40 for the copolymers C2. Preferred K values for the copolymers E1 are from 8 to 80, especially 10 to 50 and in particular 12 to 35.

The K values are relative viscosities determined by a method similar to DIN 53726 at 25° C. The K values of copolymers B1 containing Si regulators and of copolymers D1 are measured in toluene, while those for the other copolymers are determined in tetrahydrofuran.

To prepare the curable mixtures B according to the invention, the solvent-containing copolymers B1 without Si regulator and the compounds VI are mixed at from 0° to 200° C., preferably 25° to 120° C. When solvent-free copolymers B1 without Si regulator are used, the mixing is carried out at from 20° to 200° C., preferably at 80° to 150°

C. The curable mixtures B of the solvent-containing copolymers B1 with Si regulators and the compounds VI are mixed at from 20° to 150° C., preferably at 20° to 60° C. When solvent-free copolymers B1 with Si regulators are used, the mixing is carried out at from 0° to 200° C., preferably at 20° to 150° C. and, in particular, at 60° to 120° C.

To prepare the curable mixtures C according to the invention, initially the hydroxyl-containing copolymers C2 are reacted with the compounds VI by adding the compounds VI dropwise to the copolymers C2. The reaction can likewise be carried out in solution. Preferred solvents are toluene, ethyl acetate and methyl ethyl ketone.

It is also possible to use conventional urethanization catalysts. Tertiary amines such as 1,4-diazabicyclo[2.2.2]octane, bis(dimethylaminomethyl)phenol, triethylamine, benzyldimethylamine, bis(2-dimethylaminoethyl) ether, tetramethylguanidine and Lewis acids such as bis(ethylhexanoyloxy)tin, bis(dodecanoyloxy)dibutyltin and dichlorodimethyltin.

The reaction is generally carried out at from 20° to 150° C., preferably at 80° to 130° C.

The reactions normally take from 2 to 30, usually 4 to 10, hours.

It is also possible to react the compounds VI, together with urethanization catalysts, with the copolymers C2 even during the preparation thereof, which saves one process step.

The product from the reaction of the copolymers C2 and the compounds VI is subsequently mixed with the copolymers C1 at from 0° to 200° C., preferably at 40° to 120° C.

To prepare the curable mixtures D according to the invention, the compounds VIII are added to the solvent-containing copolymers D1 at from 0° to 150° C., preferably at 40° to 120° C. In the case of the solvent-free copolymers D1, this is preferably carried out at from 0° to 200° C., preferably 20° to 150° C. and, in particular, 60° to 120° C.

To prepare the curable mixtures E according to the invention, initially the hydroxyl-containing copolymers E1 are reacted with the compounds VI in the same way as the copolymers C2 with the compounds VI. The product of the reaction of the copolymers E1 and the compounds VI is then mixed at from 0° to 150° C., preferably 20° to 70° C., with the compounds VIII, with the amounts expediently being such that there is preferably from 0.2 to 1.3, particularly preferably 0.5 to 1, imine group in the compounds VIII per isocyanate group in the product.

In order to increase the rate of hydrolysis of the aldimines and ketimines in the presence of humidity, it is possible also to add to the mixtures E preferably organic carboxylic acids or arylsulfonic acids. Preferred aliphatic carboxylic acids are formic, acetic and mono-, di- and trichloroacetic acid. Aromatic carboxylic acids such as mono-, di- and trichlorobenzoic acid and salicylic acid are particularly preferred, very especially benzoic acid. Also suitable are arylsulfonic acids such as xylenesulfonic acid and, especially toluenesulfonic acid, mixtures thereof being preferred.

In order to improve the homogenization of the mixtures according to the invention, it is also possible for the copolymers and the crosslinkers initially to be dissolved in the anhydrous solvent and to remove the solvent from these solutions again by distillation.

The copolymers A and the curable mixtures B, C, D and E according to the invention can be used as adhesive, sealing and coating compositions which are self-curable with atmospheric humidity and, as such, are preferably employed without solvent.

The adhesive, sealing and coating compositions which are self-curable with atmospheric humidity can also contain conventional additives, generally in amounts of up to 400% of the weight of the curable mixtures.

Examples of conventional additives are plasticizers, fillers, reinforcing agents, curing accelerators and solvents.

Preferred plasticizers for reducing the glass transition temperature and the viscosity are phthalic esters such as diethyl, di-n-butyl, di-isoheptyl, di-2-ethylhexyl and butyl benzyl phthalates, adipic esters such as di-2-ethylhexyl and di-iso-octyl adipates, sebacic esters such as di-2-ethylhexyl and dioctyl sebacates, polyalkylene glycol esters such as di- and triethylene glycol dibenzoate, phosphoric esters such as tri-n-butyl, tri-isobutyl and tri($\beta$-chloroethyl) phosphates, chlorohydrocarbons, alkyldiphenyls and partially hydrogenated terphenyls.

The plasticizers are usually employed in amounts of from 1 to 20% by weight.

Preferred fillers and reinforcing agents are hydrophobized calcium carbonate, magnesium carbonate, talc, titanium dioxide, barium sulfate, alumina, hydrophobized silica, metal powders such as zinc and iron powders, bentonite, kaolin and soot, which are generally employed in amounts of up to 300% by weight, preferably up to 100% by weight.

The fillers are usually added as fine particles with an average particle size of, preferably, from 0.01 to 200 $\mu$m, in particular 0.01 to 10 $\mu$m.

Preferred curing accelerators for the reaction of the free isocyanate groups are organometallic compounds such as bis(dodecanoyloxy)dibutyltin, bis(dodecanoyloxy)dioctyltin, tin octylate, manganese octylate and monobutyltin oxide, amines such as N,N-dimethylcyclohexylamine, tri-n-butylamine, triethylenediamine, N,N-dimethylbenzylamine and 1,8-diazabicyclo[5.4.0]undec-7-ene and the salts thereof, eg. the hydrochlorides.

The curing accelerators are generally used in amounts of from 0.01 to 10% by weight.

Solvents are preferably added when the copolymers have been prepared by bulk polymerization or the solvent has been removed after the solvent polymerization together with the residual monomers by distillation. Preferred solvents for improving the processability and for lowering the viscosity are those which were used for the polymerization, for example aromatic hydrocarbons such as toluene and xylene and ketones such as acetone and methyl ethyl ketone, which are usually employed in amounts of up to 50% by weight.

To reduce the viscosity of solvent-free compositions, the latter can be heated up to 150° C., preferably up to 100° C., and used in the heated state, which achieves strong initial adhesion.

The compositions according to the invention can be produced in the form of one-component systems by mixing all the constituents together and storing them ready for use in a sealed container. However, they can also be used as two-component systems in which the copolymers and the crosslinkers are stored separately and are stirred together only shortly before use.

In the case of a one-component system, particular care must be taken to exclude water in order to avoid premature curing.

In the case of a two-component system, the presence of small traces of water in the starting materials and additives is less critical, which facilitates both the processing of the starting materials and the storage of the two-component system.

The copolymers A and curable mixtures B, C, D and E according to the invention are used as adhesive, sealing and coating compositions which are self-curable with atmospheric humidity.

As such, they are suitable for bonding organic and inorganic materials and for sealing and for coating such materials such as metal, wood, glass, ceramics, stone, concrete, plastics, textiles, leather, board and paper.

The compositions according to the invention cure on exposure to atmospheric humidity within a short time and, in the cured state, display increased elasticity and extensibility but no surface tackiness. In addition, in the cured state they show an increased adhesion to substrates such as aluminum, wood, glass, ceramics, concrete, brickwork and most plastics.

EXAMPLES

Compounds I, II, III, IV, V, VII and R together form 100% by weight of the polymer in each case. The percentage of the initiator I is always based on the weight of the polymer. The weights of the solvent So and of the desiccant D are based in each case on the total polymer solution.

EXAMPLES A/1 TO A/19

A) Preparation of copolymers A

A solution of 2 g (0.2% by weight) of triethyl orthoformate in 200 g (20% by weight) of toluene was heated to 100° C. and then, over the course of 4 hours, the following were added simultaneously, but separately:

1. a mixture of compounds I and II, with or without III and IV,
2. compounds V in 100 g (10% by weight) of toluene and
3. over the course of 5 hours, the initiator in 100 g (10% by weight) of toluene.

Polymerization was then continued at 100° C. for 2 hours, after which the solvent and residual monomers were removed by distillation at 100° C. under reduced pressure.

To prepare the copolymers A/18 and A/19, the compounds V were added in mixture 1., and the initiator solution was added separately as 2.

Table 1 shows the compositions of 1., 2. and 3., and the K values of the copolymers, measured in tetrahydrofuran, and the solids contents of the resulting copolymer solutions before distillation.

For comparison, the corresponding values for three copolymers with ethyl thioglycolate as regulator (Examples V1/17, V1/18 and V1/19) and for three copolymers without regulator (Examples V2/17, V2/18 and V2/19) are given, and Comparative Examples V2/18 and V2/19 were carried out in the same way as Examples A4 and A6 in the earlier German Application P 3913168. Applicational properties The peel strength and viscosity of the copolymers A according to the invention were determined as applicational properties.

For comparison, the viscosities of Comparative Examples V1/17, V2/17, V1/18, V2/18, V1/19 and V2/19 were determined.

A) Determination of the peel strength 2 g (0.5% by weight) of bis(dodecanoyloxy)dibutyltin were stirred into 400 g (99.5% by weight) of each of copolymers A/1, A/6 and A/9 heated to 100° C., and of copolymers A/15 and A/16 heated to 80° C., and 300 g (74.6% by weight) of this composition were poured in the heated state into a plastic capsule which was then sealed air-tight. After storage for 2 weeks, the capsule was heated to 80° C., after which the composition was removed and applied as a smooth layer 0.5 mm thick on cotton fabric. Various materials were then placed thereon under pressure. After storage at room temperature for 8 days, the cotton fabric was pulled off, and the peel strength was measured as the force necessary to separate the materials again.

Table 2 shows the results of this test. All the copolymers A according to the invention had high peel strengths.
B) Viscosity determination After complete removal of the solvent, 400 g (99.5% by weight) of each of the copolymers A/17, A/18, A/19, V1/17, V2/17, V1/18, V2/18, V1/19 and V2/19 heated to 100° C. were mixed with 2 g (0.5% by weight) of bis(dodecanoyloxy)dibutyltin, after which the compositions were poured at 100° C. into a plastic capsule, which was sealed air-tight. After cooling to 50° C., the compositions were removed and exposed in a layer 2 mm thick to a relative humidity of 60% at room temperature for 2 weeks.

Copolymers A/17, A/18 and A/19 with Si regulator according to the invention had low viscosity on removal from the capsules and cured completely during the two-week storage. Copolymers V1/17, V1/18 and V1/19 with ethyl thioglycolate as regulator were more viscous and were still flowable even after storage for 2 weeks. Copolymers V2/17, V2/18 and V2/19 without regulators were highly viscous and cured within 2 weeks.

EXAMPLES B/1 TO B/37

B) Preparation of curable mixtures B
 1) Preparation of copolymers B1
  1a) Preparation of copolymers B1 with Si regulators as compounds V The copolymers B1 with Si regulators were prepared in a similar manner to copolymers A.

Table 3 shows the compositions of 1. 2. and 3. added, and the K values of the copolymers, measured in THF, and the solids contents of the resulting copolymer solutions before distillation.

1b) Preparation of copolymers B1 without Si regulator as compounds V

Compound V was heated to 110° C. when toluene was used as solvent or to 75° C. when ethyl acetate was used as solvent, and the additions were made as before simultaneously, but separately: 1. over the course of 3 hours and 2. over the course of 3.5 hours.

Polymerization was then continued at 120° C. for 1 hour, or 5.5 g (1.1% by weight) or 4 g (0.7% by weight) of tert-butyl 2-ethylperhexanoate were added in the case of copolymers B1/14 and B1/19 respectively, after which polymerization was continued at 80° C. for 3 hours and at 140° C. for 2 hours respectively. In the case of the copolymer B1/21, this was followed by removal of sufficient toluene by distillation to give an 80% strength solution, whereas in the case of the copolymer B1/12 initially all the solvent was removed by distillation, after which the copolymer was taken up again in toluene to give a 60% strength solution. In the case of copolymers B1/14 and B1/15, all the solvent was removed by distillation.

Table 4 shows the compositions of V and of 1. and 2. which were added, and the K values of the copolymers, measured in THF, and the solids contents of the resulting copolymer solutions before distillation.

For comparison, the corresponding values for four copolymers with active hydrogen are given (Examples V1/18, V1/19, V1/20 and V1/21), with Comparative Example V1/18 being carried out as the acrylic adhesive A of DE-A 36 01 272, and Comparative Examples V1/19, V1/20 and V1/21 being carried out in accordance with its general teaching.

2) Preparation of isocyanate-containing prepolymers as compounds VI

Over the course of 1 hour, b% by weight of a polyoxyalkylene polyol with an OH number of Z, prepared from an alkylene oxide Alk on a starter S, and 0.1 g (0.01% by weight) of benzoyl chloride were added to a% by weight of a diisocyanate VI at 80° C. under a nitrogen atmosphere. The mixture was then stirred at 80° C. for a further hour.

The details of these experiments and their results are to be found in Table 5.

3) Preparation of curable mixtures B

To a% by weight of copolymers B1 heated to T° C. were added b% by weight of the compounds VI and 0.5% by weight of bis(dodecanoyloxy)dibutyltin or, in the case of mixtures B/33 and B/34, 1,4-diazabicyclo[2.2.2]octane.

The details of these experiments are to be found in Table 6.

For comparison, details are given of Examples V/25, V/26, V/36 and V/37, where Comparative Example V/25 was carried out as in Example 37 of DE-A 36 01 272, and Comparative Examples V/26, V/36 and V/37 were carried out in accordance with its general teaching. Applicational properties The peel strength, elongation at break and ultimate tensile strength of the curable mixtures B according to the invention were determined as applicational properties.

Also tested were the surface tackiness, processability and number of air bubbles trapped in the mixtures B/25, B/26, B/36 and B/37 according to the invention compared with Examples V/25, V/26, V/36 and V/37.

A) Determination of the peel strength

Curable mixtures B/1 to B/6 were treated in the same way as copolymers A to determine the peel strength.

Table 7 shows the results of this test. All the curable mixtures B according to the invention had high peel strengths.

To determine the peel strength of curable mixtures B/13 and B/14, the latter were poured in the heated state into plastic capsules and sealed air-tight. After storage for 1 week, the capsule was heated to 80° C., after which the composition was removed and applied in a layer 1 mm thick to aluminum foil. A cotton cloth was then placed on under pressure. After storage at room temperature and relative humidity of 60% for 4 and 24 hours in each case, the cotton cloth was pulled off while the peel strength was measured.

Table 8 shows the results of this test. In both cases the peel strength had doubled during the 20 hours between the measurements.

B) Determination of the elongation at break and ultimate tensile strength 1 mm thick films were prepared from curable mixtures B/7 to B/12, B/15 to B/24 and B/27 to B/35 by application to siliconized paper, which was stored at room temperature for 3 weeks. Subsequently, specimens were punched out of the films for measurement of the elongation at break and ultimate tensile strength by the DIN 53 504 method with an elongation rate of 100 mm/min using the S3A specimen.

Table 6 shows the results of these tests. All the mixtures B according to the invention had high elasticities.

C) Test of surface tackiness

Films 2mm thick were prepared from mixtures B/25 and V/25 and dried in air for 2 weeks.

After this time, the surface tackiness of the dried film of mixture B/25 according to the invention was distinctly less than that of the comparative mixture V/25.

D) Test of processability

The mixtures B/26 and V/26 were observed immediately after addition of the compound VI/10.

Whereas mixture B/26 according to the invention was still processable after 4 hours, the comparative mixture V/26 gelled after only 1 hour.

E) Number of entrapped air bubbles

The mixtures B/36, B/37, V/36 and V/37 were applied in a thickness of 0.5 cm to siliconized paper.

With comparative mixtures V/36 and V/37 there was severe blistering after only 15 minutes, and this became more pronounced over the course of 1 week.

By contrast, mixtures B/36 and B/37 according to the invention showed no changes whatever after 15 minutes and only a few entrapped air bubbles after 1 week.

EXAMPLES C/1 TO C/12

C) Preparation of curable mixtures C

1) Preparation of copolymers C1

Copolymers C1 were prepared in a similar manner to copolymers B1 without Si regulator.

In the case of copolymer C1/3, a further 5.5 g (1% by weight) of tert-butyl 2-ethylperhexanoate were added and polymerization was then continued at 80° C. for 3 hours.

Table 9 shows the compositions of V and of 1. and 2. added, and the K values of the copolymers, measured in THF, and the solids contents of the resulting copolymer solutions before distillation.

2) Preparation of copolymers C2

Copolymers C2 were prepared in a similar manner to copolymers C1 but under a nitrogen atmosphere.

In all cases, a further 3 g (0.5% by weight) of tert-butyl 2-ethylperhexanoate were added and polymerization was then continued at 140° C. for 1.5 hours.

Table 10 shows the compositions of V and of 1. and 2. added, and the K values of the copolymers, measured in THF, and the solids contents of the resulting copolymer solutions before distillation.

3) Products of the reaction of copolymers C2 and compounds VI

To a% by weight of the copolymer C2 were added b% by weight of urethanization catalysts U and c% by weight of the compounds VI, after which copolymers C2/2, C2/6, C2/7, C2/8 and C2/9 were heated at 130° C. under a nitrogen atmosphere for 5 hours, and copolymers C2/1, C2/3, C2/4 and C2/5 were reacted at room temperature.

The details of these experiments and their results are to be found in Table 11.

4) Preparation of curable mixtures C

To a% by weight of the products 1 to 9 from the reaction of copolymers C2 and the compounds VI were added b% by weight of the copolymers C1 and, in some cases, c% by weight of fillers and reinforcing agents F and d% by weight of urethanization catalysts U.

The details of these experiments are to be found in Table 12.

Applicational properties

The elongation at break and the ultimate tensile strength were determined as applicational properties of the curable mixtures C according to the invention.

For comparison, the corresponding values for Comparative Examples V/6, V/7, V/8,9,10 and V/11,12 were determined, with Comparative Example V/6 being carried out as in Example 1 of DE-A 29 15 864 and Comparative Examples V/7, V/8,9,10 and V/11,12 being carried out in accordance with its general teaching.

To determine the elongation at break and ultimate tensile strength, 1 mm-thick films of curable mixtures C/1 to C/12 and comparative mixtures V were prepared by application to a glass plate. Specimens were then punched out of the films for measurement of the elongation at break and ultimate tensile strength by the DIN 53 504 method with an elongation rate of 100 mm/min using the S3 A specimen. The results of the tests are to be found in Table 12.

All the mixtures C according to the invention showed high elasticities which, on the basis of lower elongations at break and higher ultimate tensile strengths, were distinctly greater than the elasticities of the comparative mixtures of the pure products of the reaction of the copolymers C2 and the compounds VI.

EXAMPLES D/1 TO D/8

D) Preparation of curable mixtures D

1) Preparation of copolymers D1

The copolymers D1 were prepared in a similar manner to copolymers A, but the added mixture 1. contained the compounds I, III and, in some cases, IV.

Table 13 shows the compositions of 1., 2. and 3. which were added, and the K values of the copolymers, measured in THF, and the solids contents of the resulting copolymer solutions before distillation.

For comparison, the corresponding values for three copolymers with methyl mercaptoacetate as regulator (Examples $V1_1/6$, $V1_1/7$ and $V1_1/8$) and for three copolymers without regulator (Examples $V1_2/6$, $V1_2/7$ and $V1_2/8$) are given, the comparative examples being carried out in accordance with DE-A 37 10 963.

2) Preparation of aldimines and ketimines as compounds VIII

A solution of 0.05% by weight of para-toluene-sulfonic acid, a% by weight of an aldehyde Ald or ketone Ket and b% by weight of an amine Am in c% by weight of solvent was heated at T° C. under a nitrogen atmosphere using a water trap until the theoretical amount of water had separated out. The solvent and the carbonyl component were then removed by distillation, and in the case of the aldimines 1 and 2 the solvent and excess aldehyde were additionally removed using a thin-film evaporator at 150° C. under 1 mbar.

The details of these experiments are to be found in Table 14.

3) Preparation of curable mixtures D

To a% by weight of the copolymer D1 heated to T° C. were added b% by weight of the compounds VIII and 0.5% by weight of bis(dodecanoyloxy)dibutyltin, copolymers D1/6, D1/7 and D1/8 initially being dissolved in 300 g (43% by weight) of toluene, after which the latter was removed by distillation under reduced pressure.

The details of these experiments are to be found in Table 15.

For comparison, details are given of Examples $V_1/6$, $V_2/6$, $V_1/7$, $V_2/7$, $V_1/8$ and $V_2/8$, which were carried out in accordance with DE-A 37 10 963. Applicational properties The peel strength and viscosity of the mixtures D according to the invention were determined.

For comparison, the viscosities of Comparative Examples $V_1/6$, $V_2/6$, $V_1/7$, $V_2/7$, $V_1/8$ and $V_2/8$ were determined.

A) Determination of the peel strength

The curable mixtures D/1 to D/5 were treated like copolymers A to determine the peel strength.

Table 16 shows the results of this test. All the curable mixtures D according to the invention had high peel strengths.

B) Viscosity determination

Curable mixtures D/6, D/7 and D/8, and the relevant comparative tests V, were treated like copolymers A to determine the viscosity.

Mixtures D/6, D/7 and D/8 with Si regulator according to the invention had low viscosity on removal from the capsules and cured completely during storage for two weeks. Mixtures $V_1/6$, $V_1/7$ and $V_1/8$ with methyl mercaptoacetate as regulator were more viscous and were still flowable and had surface tackiness even after storage for 2 weeks. The mixtures $V_2/6$, $V_2/7$ and $V_2/8$ without regulator were highly viscous and cured within 2 weeks.

EXAMPLES E/1 TO E/15

E) Preparation of curable mixtures E

1) Preparation of copolymers E1 by solution polymerization

V was heated to temperature T and then additions were made as before simultaneously, but separately: 1. over the course of a hours under a nitrogen atmosphere and 2. over the course of b hours.

Then 0.5% by weight of tert-butyl 2-ethylperhexanoate were added, after which polymerization was continued at d° C. for c hours.

In the case of copolymers E1/6 and E1/9 the solvent was finally completely removed by distillation, and in the case of copolymer E1/8 the solvent was removed by distillation immediately after addition of 2. and then the polymer was again taken up in 400 g of toluene.

Table 17 shows the compositions of V and of 1. and 2. added, the details of the experiments and the K values of the copolymers E1/1 to E1/9, measured in THF, and the solids contents of the resulting copolymer solutions before distillation.

2) Preparation of copolymers E1 by bulk polymerization 40 ml of a mixture M were heated under a nitrogen atmosphere to 80° C. An initial polymerization time of 5 minutes was followed by addition of the solids within 2.5 hours. Polymerization was then continued at 120° C. for 1 hour and then residual monomers were removed by distillation.

Table 18 shows the details of these experiments and the K values, measured in THF, of the solvent-free copolymers E1/10, E1/11 and E1/12.

3) Products of the reaction of copolymers E1 and compounds VI

To a% by weight of copolymers E1 were added 0.5% by weight of urethanization catalysts U and b% by weight of the compounds VI, after which copolymers E1/1 to E1/15 and solvent-free copolymers E1/6, E1/9, E1/10, E1/11 and E1/12 were heated at 130° C. under a nitrogen atmosphere for 10 hours, while copolymers E1/7 and E1/8 were reacted at room temperature.

The details of these experiments and their results are to be found in Table 19.

4) Preparation of curable mixtures E

To a% by weight of products 1 to 10 of the reaction of copolymers E1 and compounds VI, at 40° C., were added b% by weight of aldimines or ketimines VIII and, in some cases, c% by weight of bis(dodecanoyloxy)dibutyltin and d% by weight of a 10% by weight solution of benzoic acid in di(3-oxapentyl) phthalate.

The details of these experiments are to be found in Table 20.

For comparison, details are given of Examples V/6 to V/15, Example V/6 being carried out as Example 1 of DE-A 29 15 864 and Examples V/7 to V/15 being carried out in accordance with its general teaching. Applicational properties The elongation at break and ultimate tensile strength were determined as applicational properties of the curable mixtures E/1 to E/5 according to the invention.

The number of entrapped air bubbles was determined as applicational property of the curable mixtures E/6 to E/15 according to the invention. For comparison, the corresponding values for Examples V/6 to V/15 have been given, where Comparative Example V/6 was carried out as Example 1 of DE-A 29 15 864 and Examples V/7 to V/15 were carried out in accordance with its general teaching.

A) Determination of the elongation at break and ultimate tensile strength

The elongation at break and ultimate tensile strength were determined in a similar manner to curable mixtures B.

Table 20 shows the results of these tests. All the mixtures E/1 to E/5 according to the invention had high elasticities.

B) Determination of the number of entrapped air bubbles 2 mm-thick films were prepared from the curable mixtures E/6 to E/15 and the relevant comparative mixtures V/6 to V/15 by application to siliconized paper and were stored for 3 weeks to determine the number of entrapped air bubbles.

The films were then inspected and the entrapped air bubbles were scored from 1 to 6, where 1 means no air bubbles and 6 means a large number of air bubbles.

The results of the test are to be found in Table 21.

All the films from mixtures E/6 to E/15 according to the invention had few air bubbles, while the number of entrapped air bubbles in the films from comparative mixtures V/6 to V/15 was considerable.

Meaning of the abbreviations in Tables 1 to 21

Compounds I

I/1 = methyl acrylate
I/2 = ethyl acrylate
I/3 = n-butyl acrylate
I/4 = ethylhexyl acrylate
I/5 = methyl methacrylate Compounds II II/1 = 5-isocyanato-3-oxapentyl methacrylate
II/2 = isocyanatoethyl acrylate Compounds III III/1 = maleic anhydride
III/2 = itaconic anhydride Compounds IV IV/1 = acrylonitrile
IV/2 = styrene
IV/3 = vinyl acetate Compounds V V/1 = mercaptopropyltrimethoxysilane
V/2 = mercaptopropyltriethoxysilane Compounds VI VI/1 = prepolymer 1
VI/2 = prepolymer 2
VI/3 = prepolymer 3    } see Table 5
VI/4 = prepolymer 4
VI/5 = 5-isocyanato-3-isocyanatomethyl-1,1,3-trimethyl-cyclohexane (isophorone diisocyanate)
VI/6 = bis(4-isocyanatophenyl)methane
VI/7 = 2,4-diisocyanatotoluene
VI/8 = 1,6-diisocyanatohexane
VI/9 = bis(6-isocyanatohexylaminocarbonyl)-6-isocyanatohexylamine, isocyanate content 23% by weight
IV/10 = 2,4,6-trioxo-1,3,5-tris(6-isocyanato-1-hexyl)-hexahydro-1,3,5-triazine, isocyanate content 22% by weight Alkylene oxides Alk Alk/1 = ethylene oxide
Alk/2 = 1,2-propylene oxide Starter S S/1 = glycerol
S/2 = dipropylene glycol Compounds VII VII/1 = hydroxyethyl acrylate
VII/2 = hydroxypropyl acrylate
VII/3 = hydroxybutyl acrylate
VII/4 = hydroxyhexyl acrylate
VII/5 = polyethylene glycol monomethacrylate Compounds VIII VIII/1 = aldimine 1 from 1,6-hexamethylenediamine and 2,2-dimethylpropanal
VIII/2 = aldimine 2 from 1,6-hexamethylenediamine and methyl 2-formylisobutyrate
VIII/3 = aldimine 3 from 3-aminomethyl-3,5,5-trimethyl-cyclohexylamine (isophoronediamine) and isobutyraldehyde
VIII/4 = aldimine 4 from polyoxypropylenediamine and -triamine and 2,2-dimethylpropanal
VIII/5 = ketimine 1 from 1,6-hexamethylenediamine and methyl isobutyl ketone
VIII/6 = ketimine 2 from bis(4-aminocyclohexyl)methane and methyl isobutyl ketone Amines Am Am/1 = 1,6-hexamethylenediamine
Am/2 = 3-aminomethyl-3,5,5-trimethylcyclohexylamine (isophoronediamine)
Am/3 = polyoxypropylenediamine, MW 230
Am/4 = polyoxypropylenetriamine, MW 440
Am/5 = bis(4-aminocyclohexyl)methane Aldehydes Ald Ald/1 = 2,2-dimethylpropanal
Ald/2 = methyl 2-formylisobutyrate
Ald/3 = isobutyraldehyde Ketones Ket Ket/1 = methyl isobutyl ketone Solvents So So/1 = toluene
So/2 = ethyl acetate
So/3 = cyclohexane Initiators I I/1 = 2,2'-azobisisobutyronitrile
I/2 = tert-butyl 2-ethylperhexanoate
I/3 = tert-butyl peroctoate Regulators R R/1 = mercaptoethanol
R/2 = ethyl thioglycolate
R/3 = thioglycerol
R/4 = tert-dodecyl mercaptan
R/5 = methyl mercaptoacetate Desiccants D D/1 = triethyl orthoformate
D/2 = tetraethoxysilane Urethanization catalysts U U/1 = bis(dodecanoyloxy)dibutyltin
U/2 = bis(ethylhexanoyloxy)tin
U/3 = 1,4-diazabicyclo[2.2.2]octane Fillers and reinforcing agents F F/1 = hydrophobized calcium carbonate
F/2 = hydrophobized silica
F/3 = titanium dioxide

TABLE 1

Copolymers A

| | A/1 | A/2 | A/3 | A/4 | A/5 | A/6 | A/7 | A/8 | A/9 | A/10 | A/11 | A/12 | A/13 | A/14 |
|---|---|---|---|---|---|---|---|---|---|---|---|---|---|---|
| Addition 1.: | | | | | | | | | | | | | | |
| I/1 | | | | 35 | | | 10 | | | | | | 30 | |
| I/2 | 97.9 | 97.5 | | 60 | | | 70 | 70 | 89.9 | 93.9 | 89.8 | | 60 | 10 |
| I/3 | | | 88.5 | | | 82 | | | | | | 84.5 | | |
| I/4 | | | | | 94.7 | | | 8 | | | | | | 66.7 |
| I/5 | | | | | | | | 15 | | | | | | 10 |
| II/1 | 2 | 2 | 10 | | | 2.5 | 3 | 5 | 2 | 2 | 2 | 8 | | |
| II/2 | | | | 3 | 2 | | | | | | | | 3 | 2 |
| III/1 | | | | | | | | | | 4 | 8 | 6 | 5 | 8 |
| IV/1 | | | | | | 15 | 10 | | 8 | | | | | |
| IV/2 | | | | | 3 | | 6 | | | | | | | 3 |
| Addition 2.: | | | | | | | | | | | | | | |
| V/1 | 0.1 | 0.5 | | 2 | 0.3 | | 1 | 2 | 0.1 | 0.1 | 0.2 | | 2 | 0.3 |
| V/2 | | | 1.5 | | | 0.5 | | | | | | 1.5 | | |
| R/2 | | | | | | | | | | | | | | |
| Addition 3.: | | | | | | | | | | | | | | |
| I/1 | 0.5 | 0.5 | 0.7 | | 0.3 | 0.3 | | | 0.5 | 0.5 | 0.5 | 0.7 | | 0.3 |
| I/2 | | | | 1 | | | 0.5 | 1 | | | | | 1 | |
| K value | 28 | 26 | 20 | 20 | 25 | 35 | 29 | 27 | 41 | 25 | 24 | 19 | 21 | 24 |
| Solids content | 59.5 | 59.5 | 59.5 | 59 | 59 | 59.5 | 59 | 59 | 59.5 | 59.5 | 59.5 | 59 | 59 | 59 |

| | A/15 | A/16 | A/17 | V1/17[1] | V2/17[2] | A/18 | V1/18[3] | V2/18[4] | A/19 | V1/19[3] | V2/19[5] |
|---|---|---|---|---|---|---|---|---|---|---|---|
| Addition 1.: | | | | | | | | | | | |
| I/1 | | | | | | | | | | | |
| I/2 | 88.8 | 86.9 | 95 | 95 | 95 | 96.4 | 97 | 98 | 95.4 | 96 | 97 |
| I/3 | | | | | | | | | | | |
| I/4 | | | | | | | | | | | |
| I/5 | | | | | | | | | | | |
| II/1 | | 7 | | | | 2 | 2 | 2 | 3 | 3 | 3 |
| II/2 | 5 | | | 2 | 2 | | | | | | |
| III/1 | 6 | 6 | | 2 | 2 | | | | | | |
| IV/1 | | | | | | | | | | | |
| IV/2 | | | | | | | | | | | |
| Addition 2.: | | | | | | | | | | | |
| V/1 | | 0.1 | 1 | | | 1.6 | | | 1.6 | | |
| V/2 | 0.2 | | | | | | | | | | |
| R/2 | | 1 | | | 1 | | | 1 | | | |
| Addition 3.: | | | | | | | | | | | |
| I/1 | 0.5 | | 1 | 1 | 1 | 0.7 | 0.7 | 0.7 | 0.2 | 0.2 | 0.2 |
| I/2 | | 0.5 | | | | | | | | | |
| K value | 26 | 26 | 22 | — | — | 19.1 | 18 | 25.9 | 19.7 | 19.8 | 36 |
| Solids content | 59.5 | 59 | 59 | — | — | 59.5 | 59 | 59.5 | 59 | 59 | 59 |

[1] as copolymer A/17 with ethyl thioglycolate as regulator
[2] as copolymer A/17 without regulator
[3] as P 3913168 with ethyl thioglycolate as regulator
[4] as Example A4 of P 3913168 without regulator
[5] as Example A6 of P 3913168 without regulator

TABLE 2

Peel strength (N/mm) of copolymers A/1, A/6, A/9, A/15 and A/16

| Cotton fabric with adhesive | A/1 | A/6 | A/9 | A/15 | A/16 |
|---|---|---|---|---|---|
| Aluminum | 0.5 | 0.4 | 0.6 | 0.8 | 0.5 |
| Wood | 0.9 | 0.6 | 1.2 | 0.7 | 0.4 |
| Glass | 0.4 | 0.2 | 0.4 | 0.4 | 0.3 |
| PVC | 0.1 | 0.1 | 0.2 | 0.3 | 0.3 |
| Rubber | 0.7 | 0.3 | 0.8 | 0.6 | 0.4 |

TABLE 3

Copolymers B1 with Si regulators as compounds V

| | B1/1 | B1/2 | B1/3 | B1/4 | B1/5 | B1/6 | B1/7 | B1/8 | B1/9 |
|---|---|---|---|---|---|---|---|---|---|
| Addition 1.: | | | | | | | | | |
| I/1 | | | | | | | | 20 | |
| I/2 | 92 | 93.5 | | 90 | 91.5 | 88 | 72.5 | 30 | 95 |
| I/3 | | | 63 | | | | | 40 | |
| I/4 | | | | | | | | 10 | |
| I/5 | | | 30 | | | | | 15 | |
| III/1 | 6 | 6 | 6 | 8 | 8 | 6 | 6 | 3 | 4 |
| IV/1 | | | | | | 5 | | | |
| IV/2 | | | | | | | 1 | | |
| Addition 2.: | | | | | | | | | |
| V/1 | 2 | 0.5 | | 2 | | 1 | 0.5 | 2 | 1 |
| V/2 | | | 1 | | 0.5 | | | | |
| Addition 3.: | | | | | | | | | |
| I/1 | 0.5 | 0.5 | 0.5 | 0.5 | 0.5 | 0.5 | 0.5 | | 0.6 |
| I/2 | | | | | | | | 0.8 | |
| K value | 17.4 | 23.5 | 20.6 | 17.2 | 23.5 | 20.1 | 23.7 | 18 | 22 |
| Solids content | 59.8 | 59.9 | 59.8 | 60 | 60 | 59.2 | 59.9 | 59.8 | 60 |

TABLE 4

Copolymers B1 without Si regulator as compounds V

| | B1/10 | B1/11 | B1/12 | B1/13 | B1/14 | B1/15* | B1/16 | B1/17 | B1/18 | V1/18[1)] |
|---|---|---|---|---|---|---|---|---|---|---|
| V: | | | | | | | | | | |
| III/1 | 2 | 2 | 8 | 1 | 2 | 4 | 5 | | 2 | 2 |
| So/1 | 30 | 30 | 30 | 30 | 25 | 25 | 30 | 30 | 30 | 20 |
| So/2 | | | | | | | | | | |
| D/1 | | | | | | 0.2 | | | | |
| D/2 | | | | | | | | | | |
| Addition 1.: | | | | | | | | | | |
| I/2 | 52 | 68 | | | 96 | 92 | | 92 | | |
| I/3 | | | 58 | 98 | | | 95 | | 98 | 98 |
| I/5 | 43 | 27 | | | | | | | | |
| III/1 | | | | 1 | 2 | 4 | | 8 | | |
| IV/2 | 3 | 3 | | | | | | | | |
| IV/3 | | | 34 | | | | | | | |
| So/1 | | | | | | | | | | |
| Addition 2.: | | | | | | | | | | |
| So/1 | 10 | 10 | 10 | 10 | 10 | 15 | 10 | 10 | 10 | |
| So/2 | | | | | | | | | | |
| I/1 | 0.3 | 0.3 | 0.3 | 0.3 | 1 | 1 | 0.3 | | 0.3 | |
| I/2 | | | | | | | | 3.3 | | |
| K value | 38.8 | 42.3 | 40 | 26.1 | 25.7 | 27 | 29.1 | 18.9 | 31.9 | — |
| Solids content | 58.5 | 59.5 | 57 | 59 | 60 | 59.9 | 59 | 59.5 | 59 | — |

| | B1/19 | V1/19[2)] | B1/20* | B1/20[2)] | B1/21 | V1/21[2)] |
|---|---|---|---|---|---|---|
| V: | | | | | | |
| III/1 | | 1 | 2 | 4 | 8 | 4 | 8 |
| So/1 | | | | 30 | 20 | 30 | 10 |
| So/2 | | 35 | 25 | | | | |
| D/1 | | | | | | | |
| D/2 | | 0.1 | | | | | |
| Addition 1.: | | | | | | | |
| I/2 | | 98 | 98 | 92 | 92 | 92 | 92 |
| I/3 | | | | | | | |
| I/5 | | | | | | | |
| III/1 | | 1 | | 4 | | 4 | |
| IV/2 | | | | | | | |
| IV/3 | | | | | | | |
| So/1 | | | | | | | |

TABLE 4-continued

Copolymers B1 without Si regulator as compounds V

Addition 2.:

| | | | | | |
|---|---|---|---|---|---|
| So/1 | | | 10 | | 10 |
| So/2 | 15 | | | | |
| I/1 | 0.6 | | 0.5 | | 0.5 |
| I/2 | | | | | |
| K value | 55.9 | — | 54.5 | — | 28 | — |
| Solids content | 49.5 | — | 59.5 | — | 59 | — |

*particularly preferred copolymers
[1] as acrylic adhesive A of DE-A 36 01 272
[2] as DE-A 36 01 272

TABLE 5

Isocyanate-containing prepolymers as compounds VI

| Example | a [% by wt.] | Diisocyanate VI | b [% by wt.] | OH number Z | Alkylene oxide Alk | Starter S | Isocyanate content of the prepolymer [% by wt.] |
|---|---|---|---|---|---|---|---|
| VI/1 | 21 | VI/5 | 79 | 48 | Alk/1 & Alk/2 | S/1 | 7 |
| VI/2 | 19 | VI/5 | 81 | 35 | Alk/1 & Alk/2 | S/1 | 6.7 |
| VI/3 | 50 | VI/5 | 50 | 56 | Alk/2 | S/2 | 17.8 |
| VI/4 | 11 | VI/6 | 37 & 37 & 15 | 56 & 29 & 27 | Alk/2 & Alk/1 & Alk/2 | S/2 & S/2 & S/1 | 3.5 |

TABLE 6

Curable mixtures B

| Mixture B | a [% by wt.] | Cop. B1 | T [°C.] | b [% by wt.] | Comp. VI | UTS [N/mm²] | EB [%] |
|---|---|---|---|---|---|---|---|
| B/1 | 91 | B1/1 | 100 | 9 | VI/3 | | |
| B/2 | 98 | B1/2 | 100 | 2 | VI/5 | | |
| B/3 | 93 | B1/3 | 100 | 7 | VI/2 | | |
| B/4 | 96 | B1/5 | 100 | 4 | VI/10 | | |
| B/5 | 96 | B1/6 | 100 | 4 | VI/10 | | |
| B/6 | 95 | B1/7 | 100 | 5 | VI/9 | | |
| B/7 | 98 | B1/10 | 25 | 2 | VI/9 | 0.3 | 490 |
| B/8 | 98 | B1/10 | 25 | 2 | VI/10 | 0.2 | 640 |
| B/9 | 98 | B1/11 | 25 | 2 | VI/9 | 0.45 | 1090 |
| B/10 | 97 | B1/11 | 25 | 3 | VI/9 | 0.5 | 1000 |
| B/11 | 97 | B1/11 | 25 | 3 | VI/9 | 0.7 | 840 |
| B/12 | 92 | B1/12 | 25 | 8 | VI/1 | 0.9 | 265 |
| B/13 | 96 | B1/14 | 120 | 4 | VI/10 | — | — |
| B/14* | 96 | B1/15 | 120 | 4 | VI/10 | — | — |
| B/15 | 98 | B1/16 | 25 | 2 | VI/5 | 0.5 | 240 |
| B/16 | 92 | B1/16 | 25 | 8 | VI/5 | 0.75 | 95 |
| B/17 | 98 | B1/16 | 25 | 2 | VI/9 | 0.25 | 690 |
| B/18 | 84 | B1/16 | 25 | 16 | VI/9 | 0.35 | 80 |
| B/19 | 84 | B1/16 | 25 | 16 | VI/10 | 0.45 | 40 |
| B/20 | 70 | B1/16 | 25 | 30 | VI/1 | 0.4 | 165 |
| B/21 | 70 | B1/16 | 25 | 30 | VI/2 | 0.8 | 100 |
| B/22 | 70 | B1/16 | 25 | 30 | VI/3 | 0.6 | 510 |
| B/23 | 86 | B1/17 | 25 | 14 | VI/10 | 0.75 | 95 |
| B/24 | 98 | B1/18 | 25 | 2 | VI/5 | 0.2 | 630 |
| B/25 | 96 | B1/18 | 25 | 4 | VI/5 | — | — |
| V/25[1] | 96 | V1/18 | 25 | 4 | VI/5 | — | — |
| B/26 | 94 | B1/19 | 25 | 6 | VI/10 | — | — |
| V/26[2] | 94 | V1/19 | 25 | 6 | VI/10 | — | — |
| B/27 | 98 | B1/20 | 25 | 2 | VI/5 | 0.75 | 200 |
| B/28 | 91 | B1/20 | 25 | 9 | VI/5 | 1.3 | 130 |
| B/29 | 84 | B1/20 | 25 | 16 | VI/9 | 0.65 | 155 |
| B/30 | 84 | B1/20 | 25 | 16 | VI/10 | 0.75 | 95 |
| B/31 | 70 | B1/20 | 25 | 30 | VI/1 | 1.6 | 250 |
| B/32 | 70 | B1/20 | 25 | 30 | VI/2 | 1.65 | 230 |
| B/33 | 86 | B1/20 | 25 | 14 | VI/3 | 0.5 | 180 |
| B/34 | 86 | B1/20 | 25 | 14 | VI/4 | 0.7 | 150 |

TABLE 6-continued

Curable mixtures B

| Mixture B | a [% by wt.] | Cop. B1 | T [°C.] | b [% by wt.] | Comp. VI | UTS [N/mm$^2$] | EB [%] |
|---|---|---|---|---|---|---|---|
| B/35 | 86 | B1/20 | 25 | 14 | VI/9 | 0.65 | 150 |
| B/36 | 91 | B1/20 | 25 | 9 | VI/10 | — | — |
| V/36[2)] | 91 | V1/20 | 25 | 9 | VI/10 | — | — |
| B/37 | 98 | B1/21 | 25 | 2 | VI/10 | — | — |
| V/37[2)] | 98 | V1/21 | 25 | 2 | VI/10 | — | — | particularly preferred mixture
[1)] as Example 37 of DE-A 36 01 272
[2)] as DE-A 36 01 272

TABLE 7

Peel strength (N/mm) of curable mixtures B/1 to B/6

| Cotton fabric with adhesive | B/1 | B/2 | B/3 | B/4 | B/5 | E/E |
|---|---|---|---|---|---|---|
| Aluminum | 1.3 | 2.0 | 1.4 | 2.3 | 2.1 | 2.4 |
| Wood | 1.1 | 1.6 | 1.2 | 2.1 | 2.0 | 2.1 |
| Glass | 0.6 | 1.2 | 0.9 | 1.6 | 1.9 | 0.8 |
| PVC | 0.8 | 0.8 | 1.2 | 1.5 | 1.7 | 1.2 |
| Rubber | 0.6 | 0.7 | 1.0 | 1.8 | 1.8 | 0.9 |

TABLE 8

Peel strength (N/mm) of curable mixtures B/13 and B/14

| Aluminum foil with adhesive | B/13 after 4 h/ | B/13 after 24 h | B/14 after 4 h/ | B/14 after 24 h |
|---|---|---|---|---|
| Cotton | 0.5 | 1.1 | 1.5 | 3.0 |

TABLE 9

Copolymers C1

| | C1/1 | C1/2 | C1/3 | C1/4 | C1/5 | C1/6 |
|---|---|---|---|---|---|---|
| V: | | | | | | |
| III/1 | 2 | 5 | 1 | 4 | | |
| III/2 | | | | | | 2 |
| So/1 | 30 | 30 | | 30 | 30 | 30 |
| So/2 | | | 38 | | | |
| Addition 1.: | | | | | | |
| I/2 | | | 98 | 92 | 92 | 98 |
| I/3 | 98 | 95 | | | | |
| III/1 | | | 1 | 4 | 8 | |
| Addition 2.: | | | | | | |
| So/1 | 10 | 10 | | 10 | 10 | 10 |
| So/2 | | | 12 | | | |
| I/1 | 0.3 | 0.3 | 0.6 | 0.3 | | 0.3 |
| I/2 | | | | | 3.3 | |
| K value | 31.9 | 28.3 | 55.9 | 54.5 | 20.9 | 37.3 |
| Solids content | 59 | 60 | 49 | 59.5 | 59 | 59 |

TABLE 10

Copolymers C2

| | C2/1 | C2/2 | C2/3 | C2/4 | C2/5 | C2/6 | C2/7 | C2/8 | C2/9 |
|---|---|---|---|---|---|---|---|---|---|
| V: | | | | | | | | | |
| So/1 | 30 | | | | 30 | 30 | 30 | 30 | 30 |
| So/2 | | 30 | 30 | 30 | | | | | |
| Addition 1.: | | | | | | | | | |
| I/2 | | 98 | 84 | | 64 | | | 94 | 98 |
| I/3 | 95 | | | 79 | 33 | 95 | 92 | | |
| I/5 | | | | 16 | | | | | |
| IV/1 | | | 13 | | | | | | |
| VII/1 | | | 2 | 3 | | 3 | 5 | | |
| VII/2 | 3 | | | | | | | | |
| VII/3 | | 1 | | | 2 | | | 4 | 1 |
| R/1 | 2 | 1 | 1 | 2 | 1 | 2 | 3 | 2 | 1 |
| Addition 2.: | | | | | | | | | |
| So/1 | 10 | | | | 10 | 10 | 10 | 10 | 10 |
| So/2 | | 10 | 10 | 10 | | | | | |
| I/1 | 0.3 | 0.5 | 0.5 | 0.5 | 0.7 | 0.3 | 0.5 | 0.5 | 0.8 |
| K value | 15.1 | 21.3 | 30.3 | 15.1 | 17.2 | 14.9 | 12.1 | 17.9 | 18.8 |
| Solids content | 59 | 59.5 | 59 | 59.5 | 59.5 | 59 | 58.5 | 59.5 | 59 |

TABLE 11

Products of reaction of copolymers C2 and compounds VI

| Product | a [% by wt.] | Cop. C2 | b [% by wt.] | U | c [% by wt.] | Comp. VI | NCO content |
|---|---|---|---|---|---|---|---|
| 1 | 92 | C2/1 | 0.1 | U/1 | 8 | VI/8 | 1.2 |
| 2 | 96.7 | C2/2 | 0.1 | U/1 | 3.3 | VI/5 | 0.4 |
| 3 | 93.8 | C2/3 | 0.2 | U/1 | 6.2 | VI/5 | 0.8 |
| 4 | 91.1 | C2/4 | 0.2 | U/2 | 7.9 | VI/7 | 1.2 |
| 5 | 93 | C2/5 | 0.1 | U/3 | 7 | VI/6 | 0.7 |
| 6 | 91.3 | C2/6 | 0.1 | U/1 | 8.7 | VI/7 | 1.2 |
| 7 | 85.3 | C2/7 | 0.1 | U/1 | 14.7 | VI/5 | 1.7 |
| 8 | 90.1 | C2/8 | 0.1 | U/1 | 9.9 | VI/5 | 1.1 |
| 9 | 95.8 | C2/9 | 0.1 | U/1 | 4.2 | VI/5 | 0.5 |

TABLE 12

Curable mixtures C

| Mixture C | a [% by wt.] | Reaction product | b [% by wt.] | Cop. C1 | c [% by wt.] | F | d [% by wt.] | U | UTS [N/mm] | EB [%] |
|---|---|---|---|---|---|---|---|---|---|---|
| C/1 | 50 | 1 | 50 | C1/2 | 11 | F/1 | 0.5 | U/2 | 0.25 | 230 |
| C/2 | 67 | 2 | 33 | C1/7 | 12 | F/2 | 0.5 | U/1 | 0.3 | 325 |
| C/3 | 40 | 3 | 60 | C1/3 | 7 & 4 | F/2 & F/3 | 0.5 | U/3 | 0.8 | 480 |
| C/4 | 62 | 4 | 38 | C1/4 | 27 | F/1 | 0.5 | U/1 | 0.4 | 320 |
| C/5 | 40 | 5 | 60 | C1/4 | 10 | F/2 | 0.5 | U/2 | 0.6 | 295 |
| C/6 | 50 | 6 | 50 | C1/3 | — | — | — | — | 0.4 | 290 |
| V/6[1] | 100 | 6 | — | — | — | — | — | — | 0.5 | 145 |
| C/7 | 50 | 7 | 50 | C1/2 | — | — | — | — | 0.5 | 275 |
| V/7[2] | 100 | 7 | — | — | — | — | — | — | 0.6 | 90 |
| C/8 | 50 | 8 | 50 | C1/3 | — | — | — | — | 0.8 | 310 |
| C/9 | 50 | 8 | 50 | C1/4 | — | — | — | — | 1.1 | 290 |
| C/10 | 50 | 8 | 50 | C1/5 | — | — | — | — | 0.9 | 260 |
| V/8, 9, 10[2] | 100 | 8 | — | — | — | — | — | — | 1.3 | 140 |
| C/11 | 60 | 9 | 40 | C1/3 | — | — | — | — | 0.6 | 300 |
| C/12 | 50 | 9 | 50 | C1/4 | — | — | — | — | 0.8 | 280 |
| V/11, 12[2] | 100 | 9 | — | — | — | — | — | — | * | * |

* incomplete crosslinking
[1] as Example 1 of DE-A 29 15 864
[2] as DE-A 29 15 864

TABLE 13

Copolymers D1

| | D1/1 | D1/2 | D1/3 | D1/4 | D1/5 | D1/6 | V1$_1$/6[1] | V1$_2$/6[2] |
|---|---|---|---|---|---|---|---|---|
| Addition 1: | | | | | | | | |
| I/1 | | | | | 20 | | | |
| I/2 | 92 | 93 | 90 | 88 | 72,5 | 96 | 96 | 97 |
| I/3 | | | | | | | | |
| I/4 | | | | | | | | |
| I/5 | | | | | | | | |
| III/1 | 6 | 6 | 8 | 6 | 6 | 3 | 3 | 3 |
| IV/1 | | | | 5 | | | | |
| IV/2 | | | | | 1 | | | |
| Addition 2: | | | | | | | | |
| V/1 | 2 | | 2 | 1 | 0,5 | 1 | | |
| V/2 | | 1 | | | | | | |
| R/5 | | | | | | | 1 | |
| Addition 3: | | | | | | | | |
| I/1 | 0,5 | 0,5 | 0,5 | 0,5 | 0,5 | | | |
| I/2 | | | | | | | | |
| I/3 | | | | | | 0,6 | 0,6 | 0,6 |
| K value | 17,4 | 22,6 | 17,2 | 20,1 | 23,7 | | | |
| Solids Content | 59,8 | 59,8 | 60 | 59,2 | 59,9 | | | |

| | D1/7 | V1$_1$/7[1] | V1$_2$/7[2] | D1/8 | V1$_1$/8[1] | V1$_2$/8[2] |
|---|---|---|---|---|---|---|
| Addition 1: | | | | | | |
| I/1 | 20 | 20 | 20 | | | |
| I/2 | 76 | 76 | 77 | 95 | 95 | 96 |
| I/3 | | | | | | |
| I/4 | | | | | | |
| I/5 | | | | | | |
| III/1 | 3 | 3 | 3 | 4 | 4 | 4 |
| IV/1 | | | | | | |
| IV/2 | | | | | | |
| Addition 2.: | | | | | | |
| V/1 | 1 | | 1 | | | |
| V/2 | | | | | | |
| R/5 | | 1 | | | | 1 |

TABLE 13-continued

Copolymers D1

Addition 3.:

| | | | | | | |
|---|---|---|---|---|---|---|
| I/1 | | | | | | |
| I/2 | | | | | | |
| I/3 | 0.6 | 0.6 | 0.6 | 0.6 | 0.6 | 0.6 |
| K value | | | | | | |
| Solids content | | | | | | |

[1] as DE-A 37 10 963 with methyl mercaptoacetate as regulator
[2] as DE-A 37 10 963 without regulator

TABLE 14

Aldimines and ketimines as compounds VIII

| Example | a* [% by wt.] | Ald or Ket | b* [% by wt.] | Am | c** [% by wt.] | So | T [°C.] |
|---|---|---|---|---|---|---|---|
| VIII/1 | 65 | Ald/1 | 35 | Am/1 | 63 | L/3 | 81 |
| VIII/2 | 71 | Ald/2 | 29 | Am/1 | 49 | L/1 | 111 |
| VIII/3 | 51 | Ald/3 | 49 | Am/2 | 25 | L/1 | 111 |
| VIII/4 | 57 | Ald/1 | 15 u. 11 u. 17 | Am/1 Am/3 Am/4 | 52 | L/1 | 111 |
| VIII/5 | 65 | Ket/1 | 35 | Am/1 | 50 | L/1 | 111 |
| VIII/6 | 54 | Ket/1 | 46 | Am/5 | 50 | L/1 | 111 |

*a + b = 100% by weight
**a + b + c = 100% by weight

TABLE 15

Curable mixtures D

| Mixture D | a [% by wt.] | Cop. D1 | T [°C.] | b [% by wt.] | Comp. VIII |
|---|---|---|---|---|---|
| D/1 | 94 | D1/1 | 100 | 6 | VIII/1 |
| D/2 | 94 | D1/1 | 100 | 6 | VIII/1 |
| D/3 | 94 | D1/3 | 100 | 6 | VIII/1 |
| D/4 | 93 | D1/4 | 100 | 7 | VIII/2 |
| D/5 | 93 | D1/5 | 100 | 7 | VIII/2 |
| D/6 | 91 | D1/6 | 30 | 9 | VIII/1 |
| $V_1/6$[1] | 91 | $V_1/6$ | 30 | 9 | VIII/1 |
| $V_2/6$[1] | 91 | $V_2/6$ | 30 | 9 | VIII/1 |
| D/7 | 91 | D1/7 | 30 | 9 | VIII/1 |
| $V_1/7$[1] | 91 | $V_1/7$ | 30 | 9 | VIII/1 |
| $V_2/7$[1] | 91 | $V_2/7$ | 30 | 9 | VIII/1 |
| D/8 | 91 | D1/8 | 30 | 9 | VIII/1 |
| $V_1/8$[1] | 91 | $V_1/8$ | 30 | 9 | VIII/1 |
| $V_2/8$[1] | 91 | $V_2/8$ | 30 | 9 | VIII/1 |

[1] as DE-A 37 10 963

TABLE 16

Peel strength (N/mm) of curable mixtures D/1 to D/5

| Cotton fabric with adhesive | D/1 | D/2 | D/3 | D/4 | D/5 |
|---|---|---|---|---|---|
| Aluminum | 0.3 | 0.4 | 0.4 | 0.5 | 0.6 |
| Wood | 0.6 | 0.6 | 1.0 | 0.6 | 0.5 |
| Glass | 0.2 | 0.2 | 0.4 | 0.4 | 0.4 |
| PVC | 0.1 | 0.2 | 0.2 | 0.3 | 0.4 |
| Rubber | 0.3 | 0.3 | 0.6 | 0.4 | 0.4 |

TABLE 17

Copolymers E1 by solution polymerization

| | E1/1 | E1/2 | E1/3 | E1/4 | E1/5 | E1/6 | E1/7 | E1/8 | E1/9 |
|---|---|---|---|---|---|---|---|---|---|
| V: | | | | | | | | | |
| So/1 | 30 | 30 | 30 | 30 | 30 | | 30 | 30 | 30 |
| So/2 | | | | | | 30 | | | |
| T [°C.] | 100 | 100 | 100 | 100 | 90 | 75 | 100 | 100 | 80 |
| Addition 1.: | | | | | | | | | |
| I/2 | | | | 94 | 84 | 97 | 67 | | 90 |
| I/3 | 95 | 95 | 92 | | | | | 60 | |
| I/5 | | | | | | | 30 | | |
| IV/1 | | | | | 13 | | | | 7 |
| IV/3 | | | | | | | | 35 | |
| VII/1 | 3 | | 5 | | 2 | 2 | | | 2 |
| VII/2 | | 3 | | | | | | | |
| VII/3 | | | | 4 | | | 2 | | |
| VII/4 | | | | | | | | 3 | |
| R/1 | 2 | 2 | 3 | 2 | 1 | | | | 1 |
| R/2 | | | | | | 1 | 1 | | |
| R/3 | | | | | | | | 2 | |
| a [h] | 3.0 | 1.5 | 1.5 | 2.0 | 2.5 | 2.0 | 2.0 | 3.0 | 3.0 |
| Addition 2.: | | | | | | | | | |
| So/1 | 10 | 10 | 10 | 10 | 10 | | 10 | 10 | 10 |
| So/2 | | | | | | 10 | | | |
| I/1 | 0.3 | 0.3 | 0.5 | 0.5 | 0.5 | 0.5 | 0.5 | 0.5 | 0.5 |
| b [h] | 3.5 | 2.0 | 2.0 | 2.5 | 3.0 | 2.5 | 2.5 | 3.5 | 3.5 |
| c [h] | 1.5 | 1.0 | 1.0 | 1.0 | 1.5 | 2.0 | 2.0 | 2.4 | 2.0 |
| d [°C.] | 140 | 140 | 140 | 140 | 140 | 100 | 140 | 140 | 140 |
| K value | 14.9 | 14.3 | 12.7 | 17.6 | 30.3 | 19.2 | 20.7 | 23.7 | 22.8 |
| Solids content | 59.5 | 60 | 59.5 | 59 | 58 | 59 | 58 | 58 | 58.5 |

TABLE 18

Copolymers E1 by bulk polymerization

|  | E1/10 | E1/11 | E1/12 |
|---|---|---|---|
| Mixture M: | | | |
| I/2 | 97 | 62 | |
| I/3 | | 31 | |
| I/4 | | | 96 |
| VII/2 | | | 3 |
| VII/3 | 2 | | |
| VII/5 | | 5 | |
| I/1 | 0.5 | 0.6 | 0.5 |
| R/1 | | | 1 |
| R/2 | 1 | | |
| R/4 | | 2 | |
| K value | 23.2 | 22.5 | 19.3 |

TABLE 19

Products of the reaction of copolymers E1 and compounds VI

| Product | a [% by wt.] | Cop. E1 | U | b [% by wt.] | Comp. VI | NCO content |
|---|---|---|---|---|---|---|
| 1 | 91.3 | E1/1 | U/1 | 8.7 | VI/7 | 1.2 |

TABLE 19-continued

Products of the reaction of copolymers E1 and compounds VI

| Product | a [% by wt.] | Cop. E1 | U | b [% by wt.] | Comp. VI | NCO content |
|---|---|---|---|---|---|---|
| 2 | 89.8 | E1/2 | U/1 | 10.2 | VI/5 | 1.2 |
| 3 | 85.3 | E1/3 | U/1 | 14.7 | VI/5 | 1.7 |
| 4 | 90.1 | E1/4 | U/1 | 9.9 | VI/5 | 1.1 |
| 5 | 97.1 | E1/5 | U/1 | 2.9 | VI/5 | 0.5 |
| 6 | 96.3 | E1/6 | U/1 | 3.7 | VI/5 | 0.7 |
| 7 | 97.7 | E1/7 | U/1 | 2.3 | VI/8 | 0.3 |
| 8 | 89.4 | E1/8 | U/3 | 10.6 | VI/6 | 1.0 |
| 9 | 93.7 | E1/9 | U/1 | 6.3 | VI/5 | 1.2 |
| 10 | 97 | E1/10 | U/1 | 3 | VI/5 | 0.6 |
| 11 | 96.5 | E1/11 | U/1 | 3.5 | VI/5 | 0.7 |
| 12 | 91.7 | E1/12 | U/1 | 8.3 | VI/5 | 1.6 |

TABLE 20

Curable mixtures E

| Mixture E | a [% by wt.] | Reaction product | b [% by wt.] | Comp. VIII | c [% by wt.] | d [% by wt.] | UTS [N/mm] | EB [%] |
|---|---|---|---|---|---|---|---|---|
| E/1 | 98 | 2 | 2 | VIII/3 | — | 0.2 | 0.2 | 410 |
| E/2 | 96 | 3 | 4 | VIII/6 | 0.3 | — | 0.2 | 250 |
| E/3 | 99 | 5 | 1 | VIII/1 | — | — | 0.9 | 360 |
| E/4 | 99 | 7 | 1 | VIII/5 | 0.5 | — | 0.3 | 220 |
| E/5 | 97 | 9 | 3 | VIII/2 | — | 0.5 | 0.5 | 600 |
| E/6 | 97 | 1 | 3 | VIII/5 | — | — | | |
| V/6[1)] | 100 | 1 | — | — | 0.5 | — | | |
| E/7 | 97 | 2 | 3 | VIII/3 | 0.5 | — | | |
| V/7[2)] | 100 | 2 | — | — | 0.5 | — | | |
| E/8 | 94 | 3 | 6 | VIII/6 | 0.5 | — | | |
| V/8[2)] | 100 | 3 | — | — | 0.5 | — | | |
| E/9 | 97 | 4 | 3 | VIII/2 | — | — | | |
| V/9[2)] | 100 | 4 | — | — | 0.5 | — | | |
| E/10 | 98 | 5 | 2 | VIII/1 | — | — | | |
| V/10[2)] | 100 | 5 | — | — | 0.5 | — | | |
| E/11 | 98 | 6 | 2 | VIII/5 | . | 0.5 | | |
| V/11[2)] | 100 | 6 | — | — | 0.5 | — | | |
| E/12 | 99 | 7 | 1 | VIII/5 | — | 0.5 | | |
| V/12[2)] | 100 | 7 | — | — | 0.5 | — | | |
| E/13 | 97 | 8 | 3 | VIII/.. | — | 0.5 | | |
| V/13[2)] | 100 | 8 | — | — | 0.5 | — | | |
| E/14 | 96 | 9 | 4 | VIII/2 | — | — | | |
| V/14[2)] | 100 | 9 | — | — | 0.5 | — | | |
| E/15 | 96 | 10 | 4 | VIII/2 | — | — | | |
| V/15[2)] | 100 | 10 | — | — | 0.5 | — | | |

[1)] as Example 1 of DE-A 29 15 864
[2)] as DE-A 29 15 864

TABLE 21

Number of entrapped air bubbles in the films of mixtures E/6 to E/15 and comparative mixtures V/6 to V/15 on inspection

| Mixture E or comparative mixture V | Score |
|---|---|
| E/6 | 2 |
| V/6[1] | 4 |
| E/7 | 2 |
| V/7[2] | 5 |
| E/8 | 2–3 |
| V/8[2] | 5–6 |
| E/9 | 1–2 |
| V/9[2] | 5 |
| E/10 | 2 |
| V/10[2] | 3–4 |
| E/11 | 1–2 |
| V/11[2] | 4 |
| E/12 | 1–2 |
| V/12[2] | 4 |
| E/13 | 3 |
| v/13[2] | 6 |
| E/14 | 2 |
| V/14[2] | 5 |
| E/15 | 1–2 |
| V/15[2] | 4 |

[1] as Example 1 of DE-A 29 15 864
[2] as DE-A 29 15 864

We claim:

1. A copolymer which is self-curable with atmospheric humidity and is based on acrylic, methacrylic and/or vinyl esters and mixtures of such copolymers with cross-linkers of the following composition:

B) curable mixtures of
1) from 50 to 99.9% by weight of a copolymer B1 (=100% by weight) composed of
 a) from 30 to 99.9% by weight of the compounds I,
 b) from 0.1 to 50% by weight of the compounds III,
 c) from 0 to 50% by weight of the compounds IV and
 d) from 0 to 5% by weight of the compounds Va or Vb, and
2) from 0.1 to 50% by weight of a di- or polyisocyanate (compounds VI);

C) curable mixtures of
1) from 9 to 70% by weight of a copolymer C1 (=100% by weight) composed of
 a) from 50 to 99.9% by weight of the compounds I,
 b) from 0.1 to 20% by weight of compounds III and
 c) from 0 to 30% by weight of the compounds IV, and
2) from 29 to 90% by weight of a copolymer C2 (=100% by weight) composed of
 a) from 60 to 99.5% by weight of the compounds I,
 b) from 0.5 to 10% by weight of a comonomer with one or more hydroxyls (compounds VII) and
 c) from 0 to 30% by weight of the compounds IV, and
3) from 1 to 30% by weight of the compounds VI, with the proviso that one hydroxyl in compounds VII corresponds to from 1.7 to 2.3 isocyanates in compounds VI;

E) curable mixtures of
1) from 40 to 98% by weight of a copolymer E1 (=100% by weight) composed of
 a) from 60 to 99.5% by weight of the compounds I,
 b) from 0.5 to 10% by weight of the compounds VII and
 c) from 0 to 30% by weight of the compounds IV, and
2) from 1 to 30% by weight of the compounds VI and
3) from 1 to 30% by weight of a di- or polyaldinime and/or ketimine (compounds VIII), with the proviso that one hydroxyl in the compounds VII corresponds to from 1.7 to 2.3 isocyanates in the compounds VI where compounds I are one or more $C_1$–$C_{24}$-alkyl esters of acrylic and/or methacrylic acid and/or $C_1$–$C_{20}$ vinyl esters, compounds III is a carboxylic anhydride which can undergo free radical polymerization, compounds IV are other monomers and compounds Va and Vb are

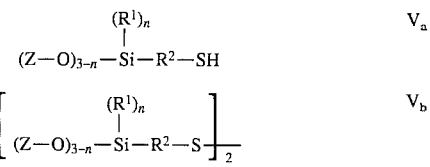

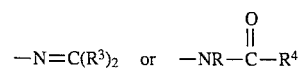

where
n is from 0 to 2,
$R^1$ is $C_1$–$C_6$-alkyl or phenyl,
$R^2$ is $C_1$–$C_{18}$-alkyl, cyclohexyl or phenyl,
Z is $C_1$–$C_{18}$-alkyl, $C_2$–$C_{18}$-alkenyl or $C_2$–$C_{18}$ alkynyl, whose carbons can be replaced by non-adjacent oxygens or halogens, or $$-N=C(R^3)_2 \quad \text{or} \quad -NR-\overset{\overset{\displaystyle O}{\|}}{C}-R^4$$

where
$R^3$ is $C_1$–$C_{12}$-alkyl and
$R^4$ is $C_1$–$C_{18}$-alkyl.

2. A copolymer which is self-curable with atmospheric humidity and mixtures of such copolymers with crosslinkers as claimed in claim 1, which have the following composition:

B) curable mixtures of
from 70 to 99% by weight of a copolymer B1 (=100% by weight) composed of
 a) from 38 to 98.4% by weight of the compounds I,
 b) from 1.5 to 10% by weight of the compounds III,
 c) from 0 to 50% by weight of the compounds IV and
 d) from 0.1 to 2% by weight of the compounds Va or Vb and
2) from 1 to 30% by weight of the compounds VI;

C) curable mixtures of
1) from 9 to 60% by weight of a copolymer C1 (=100% by weight) composed of
 a) from 62 to 98% by weight of the compounds I,
 b) from 2 to 8% by weight of the compounds III and
 c) from 0 to 30% by weight of the compounds IV and
2) from 39 to 90% by weight of a copolymer C2 (=100% by weight) composed of
 a) from 64 to 99% by weight of the compounds I,
 b) from 1 to 6% by weight of the compounds VII and
 c) from 0 to 30% by weight of the compounds IV and
3) from 1 to 30% by weight of the compounds VI, with the proviso that one hydroxyl in the compounds VII corresponds to from 1.9 to 2.1 isocyanates in E) curable mixtures of
1) from 40 to 98% by weight of a copolymer E1 (=100% by weight) composed of
 a) from 64 to 99% by weight of the compounds I,
 b) from 1 to 6% by weight of the compounds VII and c) from 0 to 30% by weight of the compounds IV and
2) from 1 to 30% by weight of the compounds VI and
3) from 1 to 30% by weight of the compounds VIII, with the proviso that one hydroxyl in the compounds VII corresponds to from 1.9 to 2.1 isocyanates in the compounds VI.

3. A copolymer which is self-curable with atmospheric humidity and mixtures of such copolymers with crosslinkers as claimed in claim 1, in whose preparation $C_1$–$C_4$-alkyl esters of acrylic and/or methacrylic acid are used as compounds I.

4. A copolymer which is self-curable with atmospheric humidity and mixtures of such copolymers with crosslinkers as claimed in claim 1, in whose preparation maleic anhydride is used as compound III.

5. A copolymer which is self-curable with atmospheric humidity and mixtures of such copolymers with crosslinkers as claimed in claim 1, in whose preparation acrylonitrile and/or methacrylonitrile and/or styrene are used as compounds IV.

6. A copolymer which is self-curable with atmospheric humidity and mixtures of such copolymers with crosslinkers as claimed in claim 1, in whose preparation mercaptopropyltrimethoxysilane and/or mercaptopropyltriethoxysilane are used as compounds Va.

7. A copolymer which is self-curable with atmospheric humidity and mixtures of such copolymers with crosslinkers as claimed in claim 1, in whose preparation di- and/or triisocyanates are used as compounds VI.

8. A copolymer which is self-curable with atmospheric humidity and mixtures of such copolymers with crosslinkers as claimed in claim 1, in whose preparation hydroxy-$C_2$–$C_6$-alkyl esters of acrylic and/or methacrylic acid are used as compounds VII.

9. A copolymer which is self-curable with atmospheric humidity and mixtures of such copolymers with crosslinkers as claimed in claim 1, in whose preparation dialdimines and/or diketimines are used as compounds VIII.

10. A sealing, coating or adhesive composition comprising curable mixture B, C, or E as claimed in claim 1 which is self-curable with atmospheric humidity.

11. An adhesive, sealing or coating composition which is self-curable with atmospheric humidity and contains curable mixtures B, C, or E as claimed in claim 1.

12. A copolymer as claimed in claim 1, wherein said compounds I are selected from the group consisting of methyl acrylate, ethyl acrylate, n-butyl acrylate, ethylhexyl acrylate and methyl methacrylate, said compounds III are selected from the group consisting of maleic anhydride and itaconic anhydride, said compounds IV are selected from the group consisting of acrylonitrile, styrene, and vinyl acetate and said compound $V_a$ is selected from the group consisting of mercaptopropyltrimethoxysilane and mercaptopropyltriethoxysilane.

13. The copolymer of claim 1, wherein Z is —N=C($R^3$)$_2$ or —$NR^3$—C(O)$R^4$.

14. The copolymer as claimed in claim 1, wherein said cross-linker has the following composition:

C) curable mixtures of
1) from 9 to 70% by weight of a copolymer C1 (=100% by weight) composed of
    a) from 50 to 99.9% by weight of the compounds I,
    b) from 0.1 to 20% by weight of compounds III and
    c) from 0 to 30% by weight of the compounds IV, and
2) from 29 to 90% by weight of a copolymer C2 (=100% by weight) composed of
    a) from 60 to 99.5% by weight of the compounds I,
    b) from 0.5 to 10% by weight of a comonomer with one or more hydroxyls (compounds VII) and
    c) from 0 to 30% by weight of the compounds IV, and
3) from 1 to 30% by weight of the compounds VI, with the proviso that one hydroxyl in compounds VII corresponds to from 1.7 to 2.3 isocyanates in compounds VI.

15. The copolymer as claimed in claim 1, wherein said cross-linker has the following composition:

E) curable mixtures of
1) from 40 to 98% by weight of a copolymer E1 (=100% by weight) composed of
    a) from 60 to 99.5% by weight of the compounds I,
    b) from 0.5 to 10% by weight of the compounds VII and
    c) from 0 to 30% by weight of the compounds IV and
2) from to 30% by weight of the compounds VI and
3) from 1 to 30% by weight of a di-or polyaldimine and/or ketimine (compounds VIII), with the proviso that one hydroxyl in the compounds VII corresponds to from 1.7 to 2.3 isocyanates in the compounds VI.

* * * * *